US007605897B2

(12) United States Patent
Lu et al.

(10) Patent No.: US 7,605,897 B2
(45) Date of Patent: Oct. 20, 2009

(54) MULTI-DOMAIN VERTICAL ALIGNMENT LIQUID CRYSTAL DISPLAYS WITH IMPROVED ANGULAR DEPENDENT GAMMA CURVES

(75) Inventors: Ruibo Lu, Orlando, FL (US); Seung Hee Lee, Oviedo, FL (US); Shin-Tson Wu, Oviedo, FL (US); Wang-Yang Li, Xinhua Town (TW); Chung-Kuang Wei, Taipei (TW)

(73) Assignees: University of Central Florida Research Foundation Inc., Tainun (TW); Chi Mei Optoelectronics, Corp., Orlando, FL (US)

( * ) Notice: Subject to any disclaimer, the term of this patent is extended or adjusted under 35 U.S.C. 154(b) by 268 days.

(21) Appl. No.: 11/780,515

(22) Filed: Jul. 20, 2007

(65) Prior Publication Data

US 2009/0021660 A1  Jan. 22, 2009

(51) Int. Cl.
G02F 1/1337 (2006.01)
(52) U.S. Cl. .................. 349/129; 349/123
(58) Field of Classification Search .................. 349/129
See application file for complete search history.

(56) References Cited

U.S. PATENT DOCUMENTS

| | | | |
|---|---|---|---|
| 4,040,727 A | 8/1977 | Ketchpel | |
| 4,090,219 A | 5/1978 | Ernstoff et al. | |
| 4,093,356 A | 6/1978 | Bigelow et al. | |
| 4,572,616 A | 2/1986 | Kowel | |
| 4,720,173 A | 1/1988 | Okada et al. | |
| 4,870,396 A | 9/1989 | Sheilds | |
| 5,071,229 A | 12/1991 | Oaki et al. | |
| 5,150,234 A | 9/1992 | Takahashi et al. | |
| 5,499,127 A | 3/1996 | Tsubota et al. | |
| 5,699,133 A | 12/1997 | Furuta | |
| 5,886,762 A | 3/1999 | Lee et al. | |
| 5,919,606 A | 7/1999 | Kazlas et al. | |

(Continued)

OTHER PUBLICATIONS

A. Takaeda, et al., "41.1: A Super-High Image Quality Multi-Domain Vertical Alignment LCD by New-Rubbing-Less Technology", SID Col. 29, 1998, p. 1077. Abstract Only.

(Continued)

*Primary Examiner*—Sung H Pak
(74) *Attorney, Agent, or Firm*—Brian S. Steinberger; Law Offices of Brian S. Steinberger, P.A.

(57) ABSTRACT

Methods, systems and apparatus for a liquid crystal display panel having a first substrate with a color filter, an overcoating and a common electrode. The second substrate includes an insulating layer surface facing the first substrate, a pixel electrode, a plurality of common and pixel domain guides formed on the common and the pixel electrodes, a plurality of electric shields on one of the common or pixel electrodes and a liquid crystal layer vertically aligned between the first and second substrates. The panel also includes a drive circuit for applying a voltage to generate an electric field to control liquid crystal molecule orientation corresponding to the plurality of domain guides and electric shields to form a multi-domain liquid crystal display panel device. The plural domain guides are either protrusions or slits formed in the common electrode and the pixel electrode to form the multi-domain vertical alignment liquid crystal device.

35 Claims, 23 Drawing Sheets

U.S. PATENT DOCUMENTS

| | | | |
|---|---|---|---|
| 6,014,188 | A | 1/2000 | Yamada et al. |
| 6,020,941 | A | 2/2000 | Ma |
| 6,124,971 | A | 9/2000 | Ouderkirk et al. |
| 6,256,010 | B1 | 7/2001 | Chen et al. |
| 6,281,952 | B1 | 8/2001 | Okamoto et al. |
| 6,295,109 | B1 | 9/2001 | Kubo et al. |
| 6,330,047 | B1 | 12/2001 | Kubo et al. |
| 6,341,002 | B1 | 1/2002 | Shimizu |
| 6,424,398 | B1 | 7/2002 | Taniguchi |
| 6,466,290 | B2 | 10/2002 | Kim et al. |
| 6,522,380 | B2 | 2/2003 | Lee et al. |
| 6,977,702 | B2 | 12/2005 | Wu |
| 7,158,201 | B2 | 1/2007 | Kim et al. |
| 7,164,284 | B2 | 1/2007 | Pan et al. |
| 2009/0096950 | A1* | 4/2009 | Kim et al. .................. 349/43 |
| 2009/0096977 | A1* | 4/2009 | Song et al. ................ 349/143 |
| 2009/0103020 | A1* | 4/2009 | Li et al. .................... 349/106 |
| 2009/0128750 | A1* | 5/2009 | Kim et al. .................. 349/96 |

OTHER PUBLICATIONS

Y. Kume, et al., "41.4: Advanced ASM Mode (Axially Symmetric Aligned Microcell Mode): Improvement of DisplayPerformances by Using Negative Dielectric Liquid Crystal", SID vol. 29, 1998, p. 1089. Abstract Only.

Yoshio Koike, et al., "Super High Quality MVA-TFT Liquid Crystal Displays", Fujitsu Sci. Tech. J., 35, 5, Dec. 1999, pp. 221-228.

N. Konforti, et al. "Phase-only modulation with twisted nematic liquid-crystal spatial light modulators", Optics Letters, vol. 13, No. 3, Mar. 1988, pp. 251-253.

J.S. Patel, et al., "Electrically tunable and polarization insensitive Fabry-Perot etalon with a liquid-crystal film", Applied Physics Letters, vol. 58, No. 22, pp. 2491-2493.

J.S. Patel, et al., "Polarization insensitive tunable liquid-crystal etalon filter", Applied Physics, Lett., 59, Sep. 1991, pp. 1314-1316.

Zhan He, et al., "Cylindrical Liquid crystal lens and its applications in optical pattern correlation Systems", Jpn. J. Appl. Phys., vol. 34, 1995, pp. 2392-2395.

Mao Ye, et al., "Transient Properties of a liquid-crystal microlens", Jpn J. Appl. Phys., vol. 40, 2001, pp. 6012-6016.

Hongwen Ren, et al., "Inhomogeneous nanoscale polymer-dispersed liquid crystals with gradient refractive index", Applied Physics Letters, vol. 81, No. 19, Nov. 4, 2002, pp. 3537-3539.

Seiji Fukushima, et al., "Ferroelectric liquid-crystal spatial light modulator achieving bipolar Image Operation and cascadability," Applied Optics, vol. 31, No. 32, Nov. 10, 1992, pp. 6859-6868.

M.F. Schiekel, et al., "Deformation of Nematic Liquid Crystals with Vertical Orientation in Electrical Fields," Applied Physics Letters, vol. 19, No. 10, Nov. 15, 1971, pp. 391-393.

Fujimori, Kohichi, et al., "53.3: New Color Filter Structures for Transflective TFT-LCD", Sharp Corporation, Display Technology Development Group, 2002, SID Digest International Symposium, pp. 1382-1385.

Lee, Baek-Woon, et al., "40.5L: Late-News Paper: TFT-LCD with RGBW Color System", Samsung Electronics Corp., in Proceeding of International Display Manufacturing Conference 2003, SID Digest, pp. 212-215.

Shin-Tson Wu and Deng-Ke Yang, "Reflective Liquid Crystal Display", John Wiley & Sons, Ltd., 2001, Chapter 3, pp. 68-70, Chapter 4, pp. 98-104.

S.T. Wu, "Nematic liquid crystal modulator with response time less than 100 μs at room temperature," Appl. Phys. Lett., vol. 57, 1990, p. 986. Abstract Only.

Xinyu Zhu, et al. "Analytical Solutions for Uniaxial-Film-Compensated Wide-View Liquid Crystal Displays" Journal of Display Technology, vol. 2, No. 1, Mar. 2006, pp. 2-20.

S. Pancharatnam, "Achromatic Combinations of Birefringent Plates" Memoir No. 71 of the Raman Research institute, Bangalore, received Mar. 5, 1955, 7 pgs.

Chi-Huang Lin, "Extraordinarily wide-view and high transmittance vertically aligned liquid crystal displays" Applied Physics Letters, 90, 151112 (2007) 3 pgs.

Jenn-Jia Su, et al., "MVA With Multi Threshold Voltages for Low Color Shift Liquid Crystal Display" IDMC Wed-P1-06 (2005) pp. 448-450.

H. Yoshida, et al. 12-2: Multi-Domain Vertically Aligned LCDs with Super-Wide Viewing Range for Gray-Scale Images, paper, 4 pages.

Ying-Chi Lu, et al., P-139: New Multi-Domain Vertical Alignment LCD with High Contrast Ratio' SID Digest (2007) pp. 725-727.

* cited by examiner

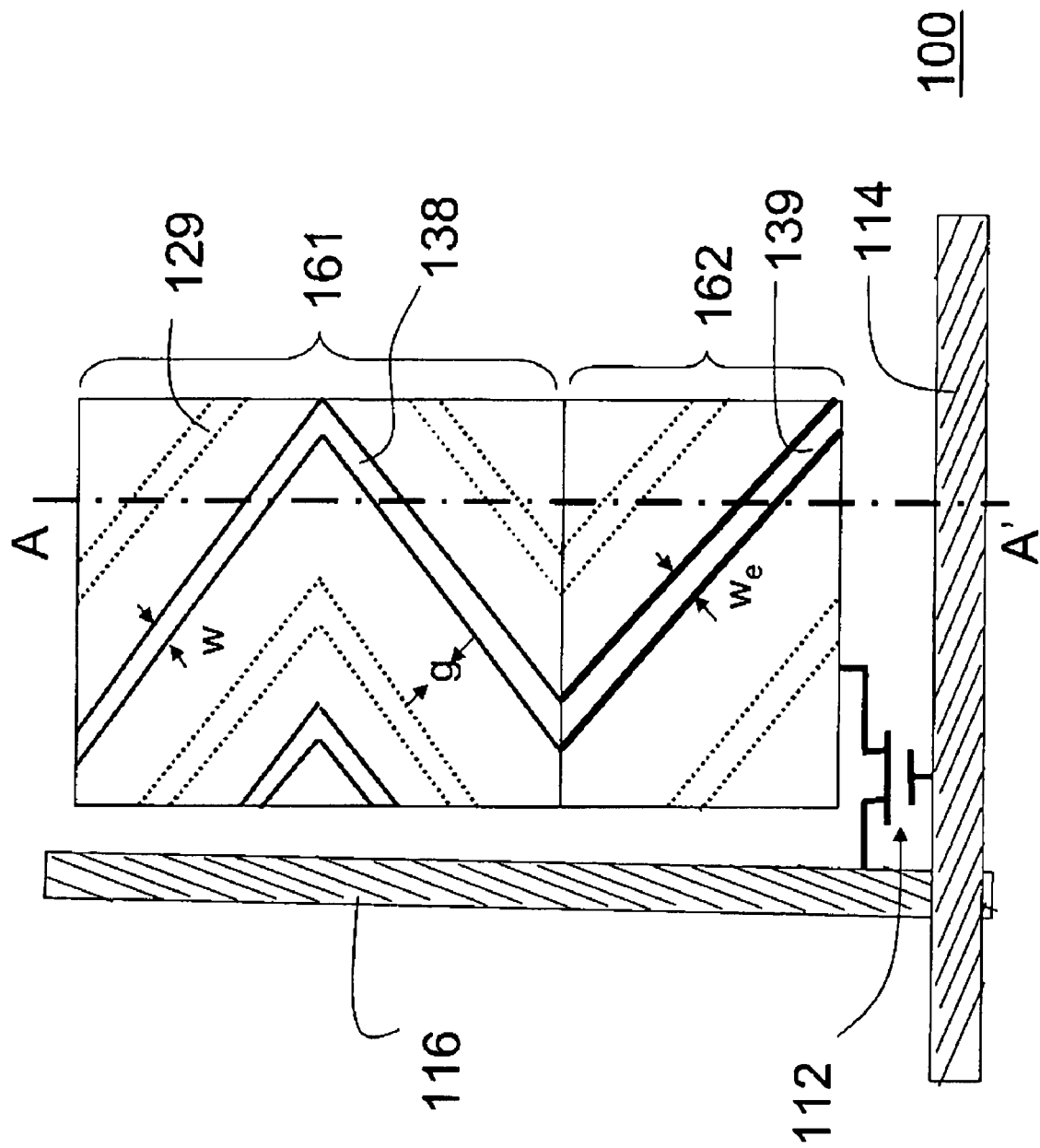

MULTI-DOMAIN VERTICAL ALIGNMENT LIQUID CRYSTAL DISPLAYS WITH IMPROVED ANGULAR DEPENDENT GAMMA CURVES

FIELD OF THE INVENTION

This invention relates to transmissive multi-domain vertical alignment liquid crystal displays, and more specifically to apparatus, methods systems and devices for producing multi-domain vertical alignment liquid crystal displays with wide viewing angles and improved gamma curves at the oblique viewing angles for high performance liquid crystal display television applications.

BACKGROUND AND PRIOR ART

For large-screen liquid crystal displays (LCDs), high contrast ratio, fast response time, wide viewing angle, and excellent color performance such as small color shift and good angular-dependent color uniformity all have to be satisfied simultaneously. The vertical alignment (VA) technology as one of the mainstream LCD TV technologies has been widely investigated and developed. The normally black VA LCDs exhibit an excellent contrast ratio at normal incident angle. The response time issue can be solved with the overdrive and undershoot approach describe in S. T. Wu, "Nematic liquid crystal modulator with response time less than 100 µs at room temperature", Appl. Phys. Lett., Vol. 57, p. 986, (1990).

To achieve a wide viewing angle, the formation of multi-domain vertical alignment (MVA) under the external electric fields is critically required. Currently, four-domain and eight-domain VA LC configurations are commonly practiced by the adoption of protrusions or slits on the device substrates. With the help of the optimized compensation films, the viewing angle of a typical MVA-LCD can reach above 100:1 at the ±80° viewing cone as described in Q. Hong et al., "Extraordinarily-high-contrast and wide-view liquid crystal displays", Appl. Phys. Lett., vol. 86, p. 121107 (2005). Meanwhile, compared with the in-plane switching (IPS) mode, the color performance in the color shift and angular color uniformity of VA mode is a little inferior, which usually shows an evident gamut curve distortion at the large oblique viewing angles as described in H. C. Jin, et al., "Development of 100-in. TFT-LCDs for HDTV and public-information-display applications", Journal of the SID, vol. 15, p. 277 (2007).

Some methods have been proposed to improve the gamma curve of VA mode LCDs. From the panel driving point, the dynamic correction of LCD gamma curve approach has been described in U.S. Pat. No. 6,256,010 B1 issued to Y. C. Chen et al. in 2001 and U.S. Pat. No. 7,164,284 B2 issued to H. Pan et al. in 2007. On the contrary, its effectiveness in reducing the gamma curve at the oblique viewing angle is questionable. From the panel design point, a capacitive coupled (CC) method is disclosed in U.S. Pat. No. 7,158,201 B2 issued to by H. S. Kim et al in 2007, and a two-TFT approach is proposed to produce eight domains as published by S. S. Kim in SID'05 Symposium Digest, p. 1842-1847, and by C. C. Liu et al in Int'l Display Workshops, p. 625-626 (2006). Although the abovementioned methods can improve the corresponding angular-dependent gamma curves, they require complex electronic circuits. In addition, the manufacturing cost and device power consumption increase when two TFTs are used in a unit pixel.

SUMMARY OF THE INVENTION

An objective of the invention is to provide methods, systems, apparatus and devices for a vertical alignment mode LCD with different pixel regions which show different threshold voltages in a transmissive mode.

An objective of the invention is to provide methods, systems, apparatus and devices for a vertical alignment mode LCD with different pixel regions to form multi-domain liquid crystal distribution in a transmissive mode.

An objective of the invention is to provide methods, systems, apparatus and devices for a vertical alignment mode transmissive LCD structure showing small angular-dependent gamma curve distortion.

An objective of the invention is to provide methods, systems, apparatus and devices for a vertical alignment mode transmissive LCD structure showing wide viewing angles.

An objective of the invention is to provide methods, systems, apparatus and devices for a method of manufacturing a multi-domain vertical alignment LCD panel with enhanced color performance with simple driving circuits and low power consumption.

An objective of the invention is to provide methods, systems, apparatus and devices for a transmissive LCD with simple device structure and rubbing-free process for high yield mass production.

The first embodiment provides a liquid crystal display panel comprising a first substrate having a color filter formed on the first substrate, an over-coating layer having a thickness formed over the color filter and a common electrode disposed over the over-coating layer. The second substrate having an insulating layer on an interior surface facing the first substrate, a pixel electrode formed over the insulating layer, a plurality of common and pixel domain guides formed on both the common electrode and the pixel electrode, a plurality of electric shields on one of the common electrodes or the pixel electrode to separate the corresponding one of the common electrode and pixel electrode into at least two different regions and a liquid crystal layer vertically aligned sandwiched between the first and second substrates. The display panel also includes a drive circuit connected with the common electrode and the pixel electrode for applying a voltage to the common electrode and the pixel electrode to generate an electric field between the first substrate and the second substrate to control a liquid crystal molecule orientation corresponding to a positioning of the plurality of domain guides and plurality of electric shields to form a multi-domain liquid crystal display panel. The plural domain guides is either a protrusion or a slit formed in the common electrode and the pixel electrode dividing the common electrode into at least two common electrodes and dividing the pixel electrode into two pixel electrodes to form the multi-domain liquid crystal configuration.

In an embodiment, the plural domain guides includes a common domain guide in the common electrode and a pixel domain guide in the pixel electrode in each pixel region of the liquid crystal display panel, the common domain guide above and on one side of the pixel domain guide. In another embodiment, the common domain guide is located above and on one side of the pixel domain guide and the electric shield is located above and on an opposite side of the pixel domain guide dividing the common electrode into a first, second and third common electrode to form the multi-domain liquid crystal display panel having eight domains in each pixel region. In yet another embodiment, the common domain guide is located above and on one side of the pixel domain guide and the electric shield is located above and on an opposite side of the pixel domain guide dividing the common electrode into a first and a second common electrode to form the multi-domain liquid crystal display panel having six domains in each pixel region. In alternative embodiment, the common domain guide includes a first and a second common domain guide on opposite sides of the pixel domain guide dividing the common electrode into three common electrodes and a pixel electric shield located below one of the common domain guides covering the pixel domain guide and adjacent to the pixel electrode to form a single pixel electrode below one of the common guides to form the multi-domain liquid crystal display panel having eight domains in each pixel region.

Further objects and advantages of this invention will be apparent from the following detailed descriptions of the presently preferred embodiments which are illustrated schematically in the accompanying drawings.

BRIEF DESCRIPTION OF THE FIGURES

FIG. 1a shows a plane view of a MVA LCD panel according to an embodiment of the present invention with the domain guiding protrusions.

FIG. 1b shows a schematic cross-sectional view along line A-A' in FIG. 1a.

FIG. 6b shows a schematic cross-sectional view along line A-A' in FIG. 6a.

FIG. 10b shows a schematic cross-sectional view along line A-A' in FIG. 10a.

FIG. 14b shows a schematic cross-sectional view along line A-A' in FIG. 14a.

FIG. 18b shows a schematic cross-sectional view along line A-A' in FIG. 18a.

DESCRIPTION OF THE PREFERRED EMBODIMENTS

Figure 1B:
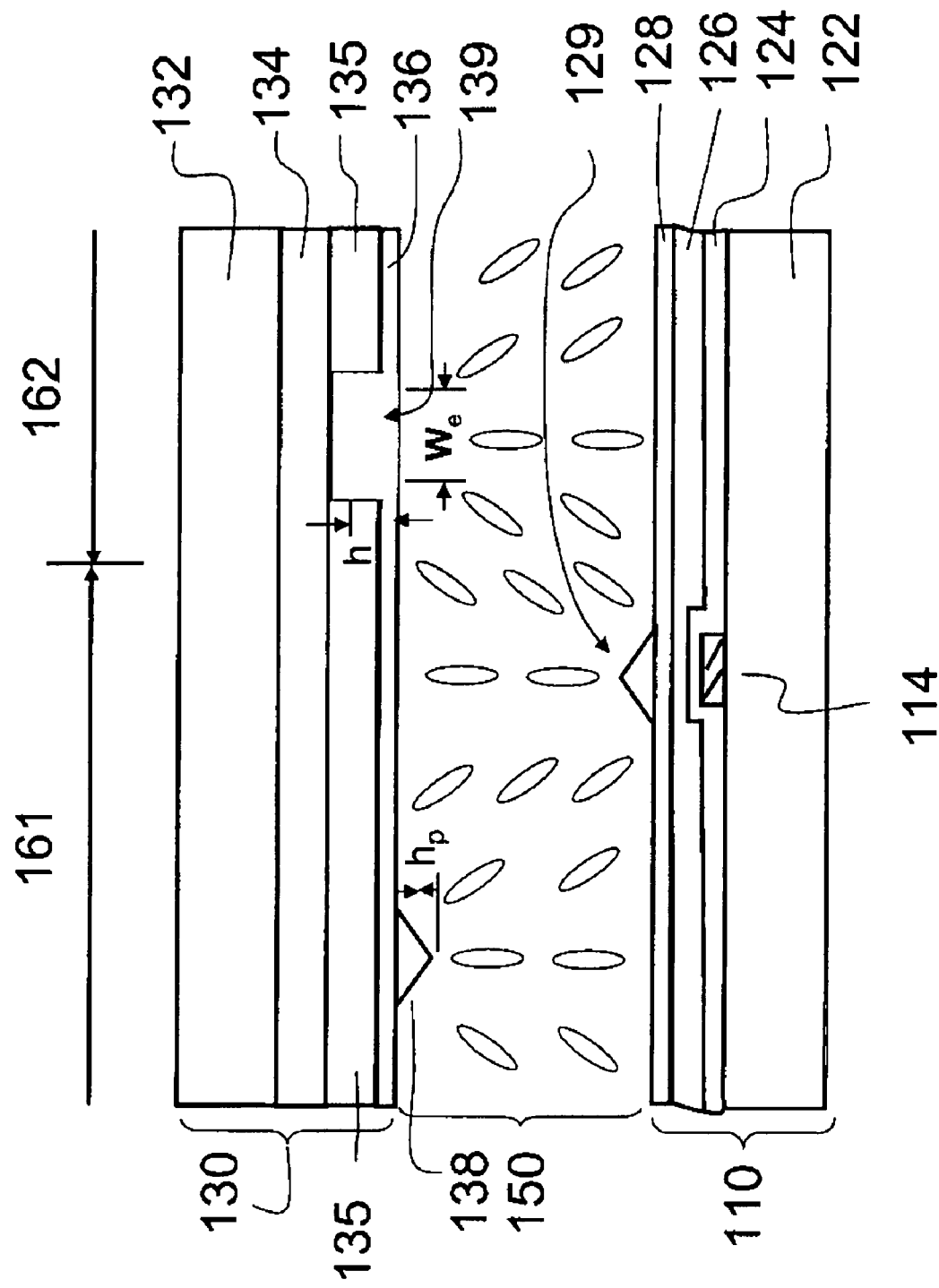

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a listing of reference numerals used throughout the specification and the Figures to identify elements of the present invention.

| | |
|---|---|
| 100 | MVA LCD panel |
| 110 | bottom substrate |
| 112 | thin film transistors |
| 114 | scan lines |
| 116 | data lines |
| 122 | transparent substrate |
| 124 | gate insulating layer |
| 126 | passivation layer |
| 128 | pixel electrodes |
| 129 | domain guiding layer |
| 130 | top substrate |
| 132 | transparent substrate |
| 134 | color filter |
| 135 | over-coating layer |
| 136 | common electrode |
| 138 | domain guiding layers |
| 139 | shielding layer |
| 150 | LC layer |
| 161 | main region |
| 162 | sub region |
| 600 | MVA LCD |
| 610 | bottom substrate |
| 612 | thin film transistor |
| 614 | scan lines |
| 616 | data lines |
| 622 | transparent substrate |
| 624 | gate insulating layer |
| 626 | passivation layer |
| 628 | pixel electrodes |
| 629 | guiding layer |
| 630 | top substrate |
| 632 | transparent substrate |
| 634 | color filter |
| 635 | over coating layer |
| 636 | common electrode |
| 638 | domain guiding layer |
| 639 | electric shielding |
| 650 | LC material |
| 661 | main region |
| 662 | sub region |
| 663 | sub region |
| 1000 | MVA LCD |
| 1010 | bottom substrate |
| 1012 | thin film transistors |
| 1014 | scan lines |
| 1016 | data lines |
| 1022 | transparent substrate |
| 1024 | gate insulating layer |
| 1026 | passivation layer |
| 1028 | pixel electrodes |
| 1029 | domain guiding layer |

-continued

| | |
|---|---|
| 1030 | top substrate |
| 1032 | transparent substrate |
| 1034 | color filter |
| 1035 | over coating |
| 1036 | common electrode |
| 1037 | domain guiding layer |
| 1038 | domain guiding layer |
| 1039 | electric shielding layer |
| 1050 | LC layer |
| 1061 | main region |
| 1062 | sub region |
| 1400 | MVA LCD |
| 1410 | bottom substrate |
| 1412 | thin film transistors |
| 1414 | scan lines |
| 1416 | data lines |
| 1422 | transparent substrate |
| 1424 | gate insulating layer |
| 1426 | passivation layer |
| 1427 | over coating |
| 1428 | pixel elements |
| 1429 | domain guiding layer |
| 1430 | top substrate | plurality of thin film transistors (TFTs) 112, a plurality of scan lines 114, a plurality of data lines 116, a gate insulating layer 124, a passivation layer 126, and a plurality of pixel electrodes 128 fabricated on an inner surface of the transparent substrate 122. Each TFT 112 is deposited inside one of the unit pixel region and is connected to the corresponding scan lines 114 and data lines 116 as shown in FIG. 1a. The gate insulating layer 124 shown in FIG. 1b is formed to cover the scan lines 114, and the passivation layer 126 is formed to cover the data lines 116 over the transparent substrate 122 which can be a transparent glass.

Both gate insulating layer 124 and passivation layer 126 may be an organic material such as a-Si:C:O and a-Si:O:F, or an inorganic material such as silicon nitride ($SiN_x$) and silicon oxide ($SiO_2$), which is prepared by plasma enhanced chemical vapor deposition (PECVD) or similar sputtering methods. Each pixel electrode 128 is electrically connected to a corresponding TFT 112. The transparent pixel electrode 128 is usually made of an electrically conductive material with high optical transparency, such as indium tin oxide (ITO), indium zinc oxide (IZO) or zinc oxide (ZnO). Each pixel electrode 128 has a plurality of domain guiding layer 129, which can be LC alignment protrusions formed by depositing an organic material such as a-Si:C:O and a-Si:O:F, or an inorganic material such as silicon nitride ($SiN_x$) and silicon oxide ($SiO_2$), or LC alignment slits formed by the opening patterns through the etching of transparent pixel electrode 128.

The top substrate 130 includes of a transparent substrate 132, a color filter 134, an over-coating layer 135, a plurality of common electrode 136, a plurality of domain guiding layer 138, and a plurality of electric shielding layer 139. The over-coating layer 135 is disposed beneath the transparent substrate 132 to cover the color filter 134. The material of the over-coating layer 135 can be an acrylic resin, polyamide, ployimide, or novolac epoxy resin. The over-coating layer 135 is patterned by a process employing photolithography and plurality of thin film transistors (TFTs) 112, a plurality of scan lines 114, a plurality of data lines 116, a gate insulating layer 124, a passivation layer 126, and a plurality of pixel electrodes 128 fabricated on an inner surface of the transparent substrate 122. Each TFT 112 is deposited inside one of the unit pixel region and is connected to the corresponding scan lines 114 and data lines 116 as shown in FIG. 1a. The gate insulating layer 124 shown in FIG. 1b is formed to cover the scan lines 114, and the passivation layer 126 is formed to cover the data lines 116 over the transparent substrate 122 which can be a transparent glass.

Both gate insulating layer 124 and passivation layer 126 may be an organic material such as a-Si:C:O and a-Si:O:F, or an inorganic material such as silicon nitride ($SiN_x$) and silicon oxide ($SiO_2$), which is prepared by plasma enhanced chemical vapor deposition (PECVD) or similar sputtering methods. Each pixel electrode 128 is electrically connected to a corresponding TFT 112. The transparent pixel electrode 128 is usually made of an electrically conductive material with high optical transparency, such as indium tin oxide (ITO), indium zinc oxide (IZO) or zinc oxide (ZnO). Each pixel electrode 128 has a plurality of domain guiding layer 129, which can be LC alignment protrusions formed by depositing an organic material such as a-Si:C:O and a-Si:O:F, or an inorganic material such as silicon nitride ($SiN_x$) and silicon oxide ($SiO_2$), or LC alignment slits formed by the opening patterns through the etching of transparent pixel electrode 128.

The top substrate 130 includes of a transparent substrate 132, a color filter 134, an over-coating layer 135, a plurality of common electrode 136, a plurality of domain guiding layer 138, and a plurality of electric shielding layer 139. The over-coating layer 135 is disposed beneath the transparent substrate 132 to cover the color filter 134. The material of the over-coating layer 135 can be an acrylic resin, polyamide, ployimide, or novolac epoxy resin. The over-coating layer 135 is patterned by a process employing photolithography and etching to form a plurality of partially etched regions, where part of the un-etched regions (not shown) can be thick enough to function as the cell spacer in order to simplify the manufacturing process and lowering the manufacturing cost.

Each common electrode 136 is deposited over the over-coating layer 135. The transparent common electrode 136 is usually made of an electrically conductive material with high optical transparency, such as indium tin oxide, indium zinc oxide or zinc oxide. An electric shielding layer 139 is deposited to fill the partially etched regions on the over-coating layer 135 and the common electrode 136. The electric shielding layer 139 could be an organic material such as a-Si:C:O and a-Si:O:F, or an inorganic material such as silicon nitride ($SiN_x$) and silicon oxide ($SiO_2$), which is prepared by plasma enhanced chemical vapor deposition (PECVD) or other similar sputtering methods commonly known in the art. Each common electrode 136 has a plurality of domain guiding layer 138, which can be LC alignment protrusions formed by the deposition of organic materials such as a-Si:C:O and a-Si:O:F, or inorganic materials such as silicon nitride ($SiN_x$) and silicon oxide ($SiO_2$), or the LC alignment slits formed by the opening patterns through the etching of transparent common electrode 136.

A liquid crystal layer 150 is vertically aligned in-between the bottom substrate 110 and the top substrate 130. When the TFT 112 is switched to the ON-state, an electric filed is generated between the bottom substrate 110 and top substrate 130. As a result, the LC molecules in LC layer 150 are tilted into various directions with the aid of the domain guiding layers 129, 138, and the electric shielding layer 139 to form a multi-domain LC configuration.

Due to the screening effect from the electric shielding layer 139, the electric filed strength is weaker in the region nearest to the electric shielding layer 139 than the other regions. Therefore, the existence of the electric shielding layer 139 divides a unit pixel 100 into at least two different regions such as a main region 161 and a sub region 162, which typically show two different threshold voltages. The sub region 162 with the electric shielding layer 139 usually has a higher threshold voltage resulting in a lower luminance under different gray levels. Thus, the angular-dependent gamma curves of the MVA LCD panel are improved from the combined luminance effect of the two different regions 161 and 162 under various gray levels. The area ratio between the main region 161 and the sub region 162 are chosen from a range of approximately 10:1 to approximately 1:10, while the area ratio between the electric shielding layer 139 and the corresponding liquid crystal display panel 100 is typically larger than 1:1000.

For a typical MVA LCD using zigzag shaped electrodes, there are usually four LC domains formed when driven by the TFT array in a unit pixel. Using the configuration of the present invention, more than four LC domains are formed using only one TFT due to the introduction of sub region 162 which has a threshold voltage that is different from the threshold voltage of the main region 161. As a result, the viewing angle of the MVA LCD panel is widened.

During the simulation, a repeated unit pixel size of an MVA LCD structure with 100 μm×450 μm, and the protrusion-type pixel domain guiding layers 129 and common domain guiding layers 138 having zigzag shapes with widths of approximately w=12 μm and protrusion heights of approximately $h_p$=1.2 μm was used. The gap between the neighboring domain guiding layers on the projection plane was approximately g=35 μm. The electric shielding layer 139 is made of silicon nitride which is flat and has a width of approximately $w_e$=12 μm and a height of approximately h=1.2 μm with a dielectric constant of 7.0. The area ratio between the main region 161 and the sub region 162 was selected to be approximately 2:1 and the cell gap between the top and bottom substrates was approximately 4 μm. A Merck negative $\Delta\epsilon$ LC mixture MLC-6608 (birefringence $\Delta n$=0.083 at $\lambda$=550 nm, dielectric anisotropy $\Delta\epsilon$=−4.2 and rotational viscosity $\gamma_1$=0.186 Pa·s) was used as the liquid crystal material 150 which was vertically aligned with the substrates in the initial state. The LC materials azimuthal angle in this example is approximately 0 and the pretilt angle is approximately 90°.

Figure 2:
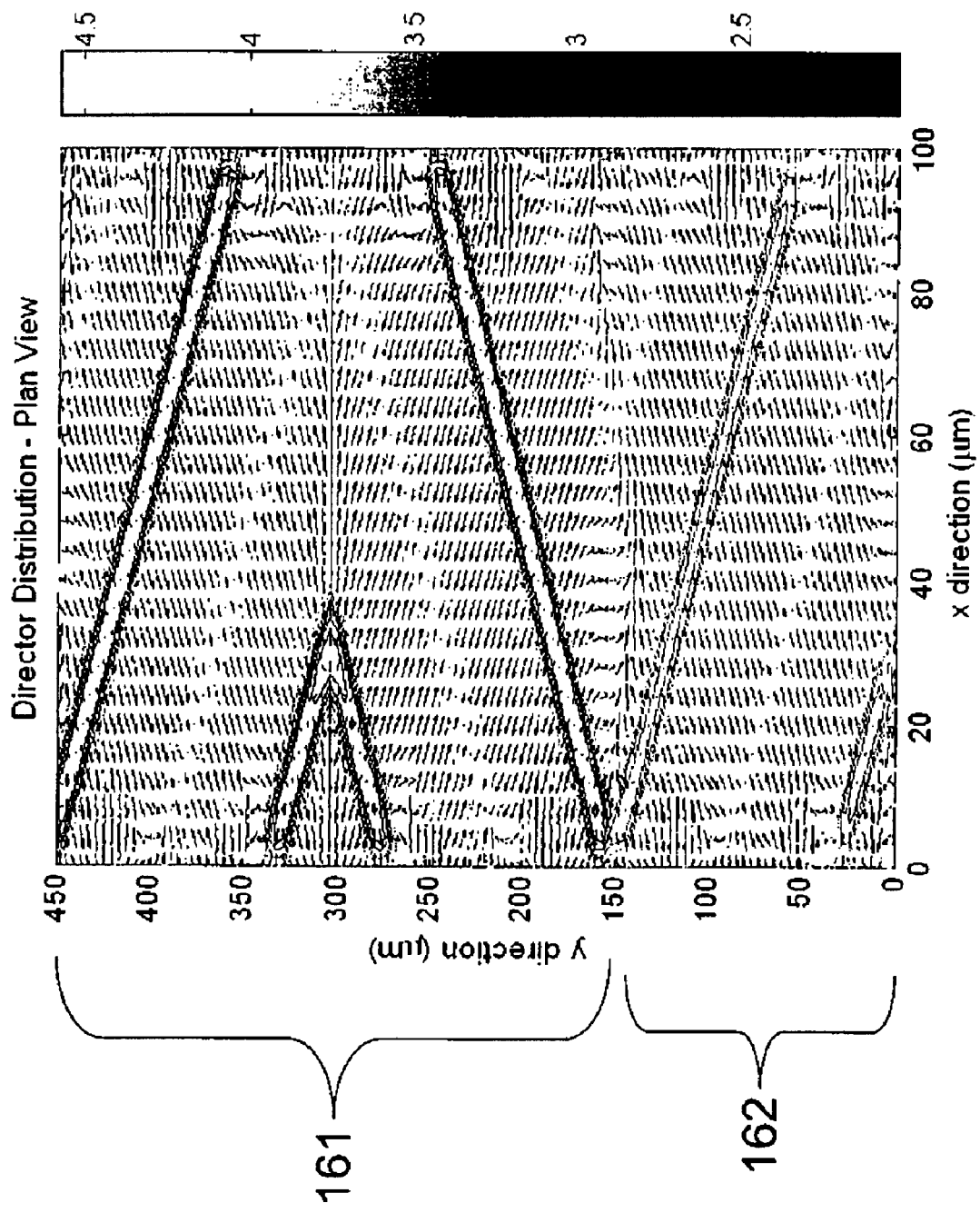
FIG. 2 shows the simulated LC director distribution of the MVA LCD shown in FIGS. 1a and 1b when the applied voltage is approximately 6 $V_{rms}$.

FIG. 2 shows the simulated LC director distribution of for the configuration shown in FIGS. 1a and 1b when the applied voltage is approximately 6 $V_{rms}$ between the common electrodes 136 and pixel electrodes 128. The distribution shown is the plane view cut from the center of the pixel unit along the Z-axis direction. As shown, the LC directors are reoriented perpendicular to the electric field direction due to the fringing field and the longitural electric field between the bottom substrate 110 and the top substrate 130. With the aid of the pixel and common domain guiding protrusion layers 129 and 138, respectively, a typical four-domain structure is formed in the main region 161. In the sub region 162, the tilted electric shielding layer 139 helps form an additional two domains. Therefore, a total of six LC domains are formed in the whole pixel unit 100 with the application of an external electric field from the TFT 112. This six-domain MVA LCD enhances the viewing angle of the panel provided that suitable compensation films are employed as described in S. T. Wu and D. K. Yang, Reflective Liquid Crystal Displays (Wiley, New York, 2001); Chap. 12.

Figure 3:
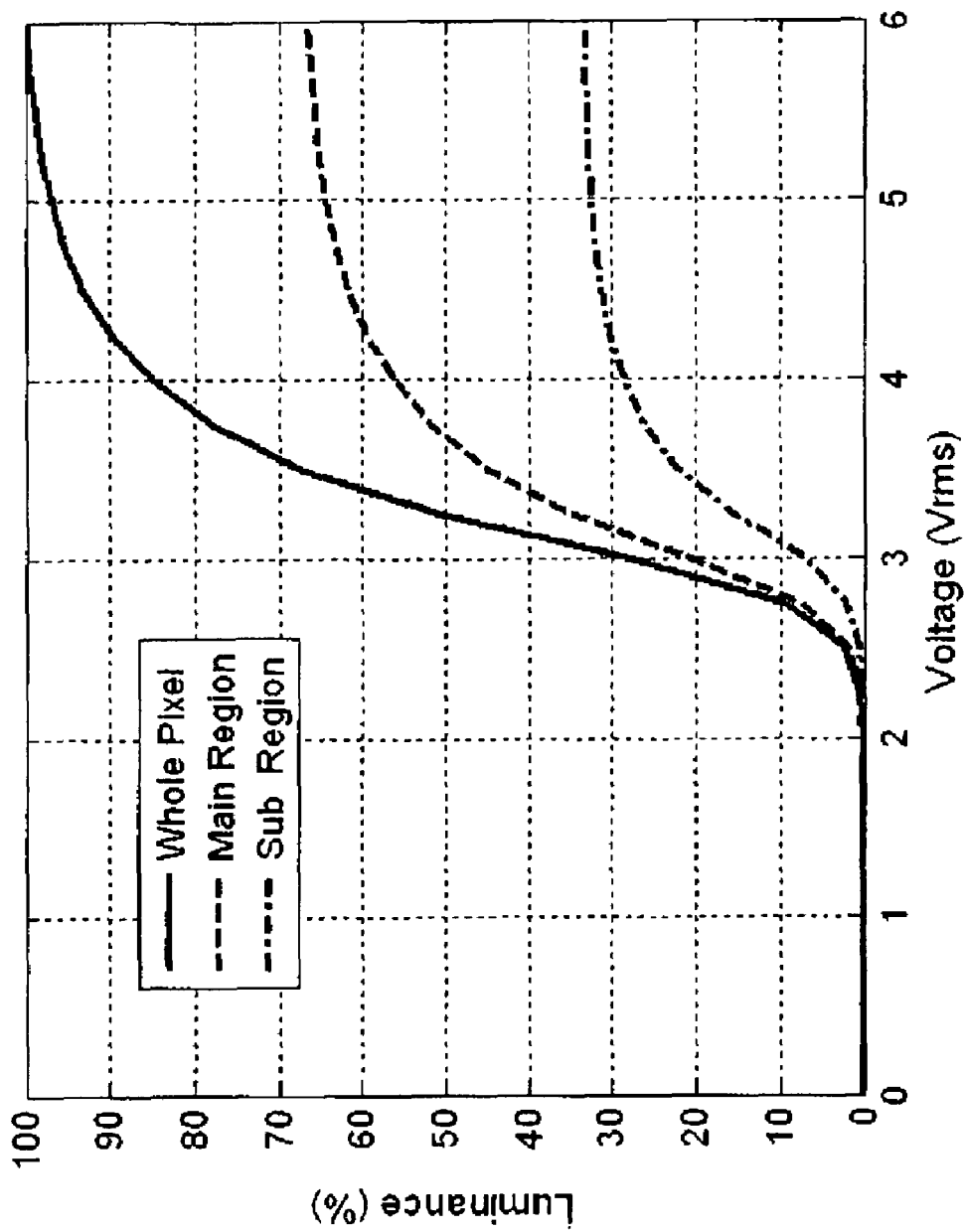
FIG. 3 shows the voltage-dependent luminance curves of the MVA LCD shown in FIGS. 1a and 1b.

FIG. 3 shows the voltage-dependent luminance curves throughout the entire pixel unit 100, the main region 161 and the sub region 162, respectively. In this example, the incident white light source is from a conventional cold cathode fluorescent lamp (CCFL) backlight passing through the RGB color filters before entering the MVA LCD panel which is sandwiched between two crossed linear polarizers. The threshold voltage of the main region 161 is approximately 2.25 $V_{rms}$ while the sub region is approximately 2.40 $V_{rms}$.

The electric shielding layer 139 causes the threshold voltage to increase a small amount resulting in the sub region 162 having a lower luminance than the main region 161 under the same gray level defined by the entire pixel 100.

To quantitatively characterize the off-axis image quality, an off-axis image distortion index, D(θ, φ), is defined as $$D(\theta, \varphi) = \left\langle \frac{|\Delta B_{i,j(on-axis)} - \Delta B_{i,j(off-axis\_0,\varphi)}|}{\Delta B_{i,j(on-axis)}} \right\rangle_{i,j=0\sim255} \quad \text{(Eq. 1)}$$

Here, $\Delta B_{i,j}$ is the brightness difference between gray-i and gray-j, and < > denotes the average for all cases of arbitrary gray levels. D(θ, φ) is within the range from approximately 0 to approximately 1. A smaller D(θ, φ) implies to a smaller image distortion as represented from the angular-dependent gamma curves, i.e. a better off-axis image quality.

Figure 4:
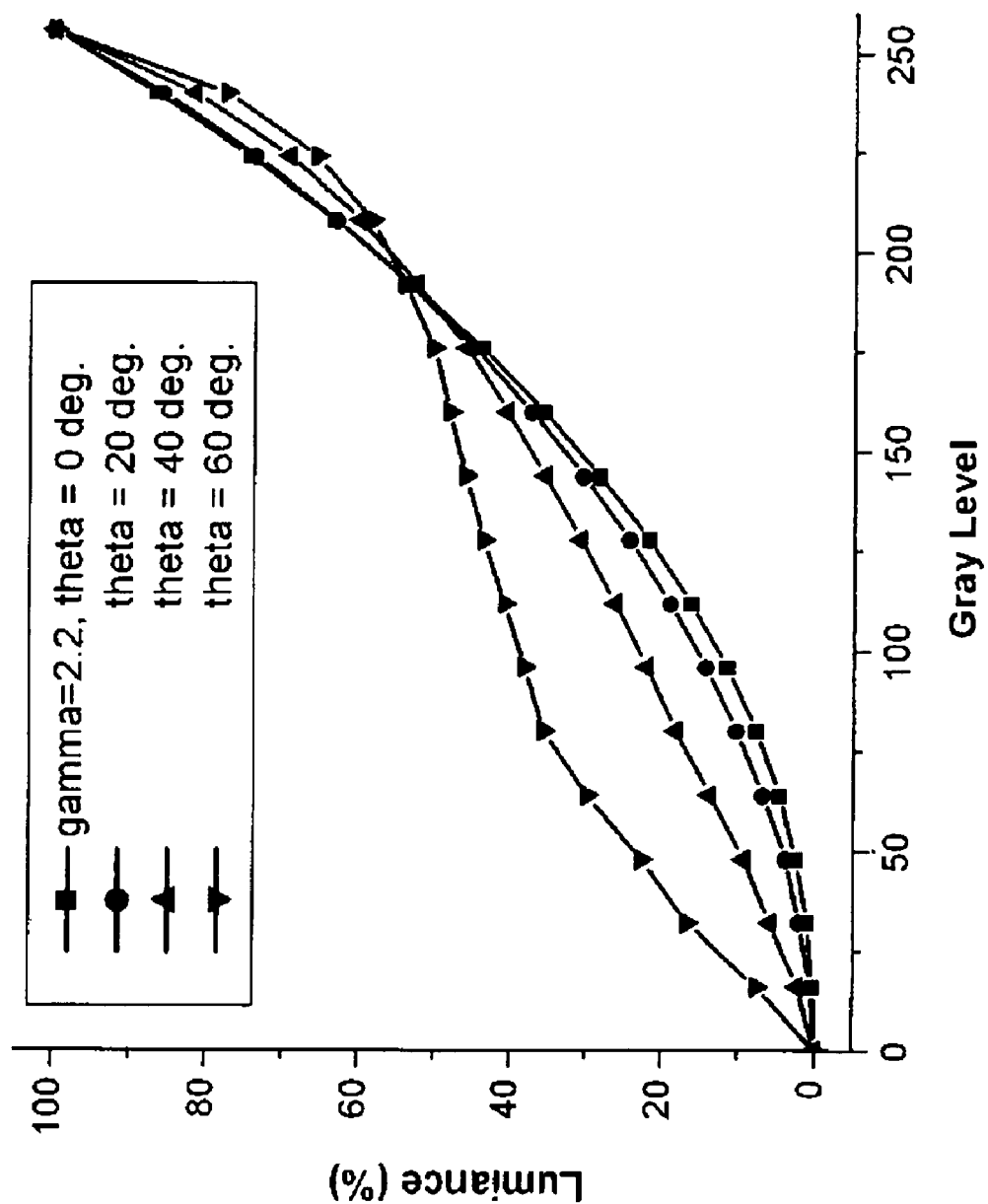
FIG. 4 shows the typical gamma curves at different incident angles with a gamma correction factor $\gamma=2.2$ for the MVA LCD shown in FIGS. 1a and 1b.

FIG. 4 is a graphical plot of the typical gamma curves of the pixel unit 100 at different incident angles with a gamma correction factor of approximately γ=2.2. Here, the azimuthal angle is set at approximately 0°, and an 8-bit gray scale with 256 gray levels is evaluated. At (θ, φ)=(60°, 0°) viewing direction, its D value is 0.2994.

Figure 5:
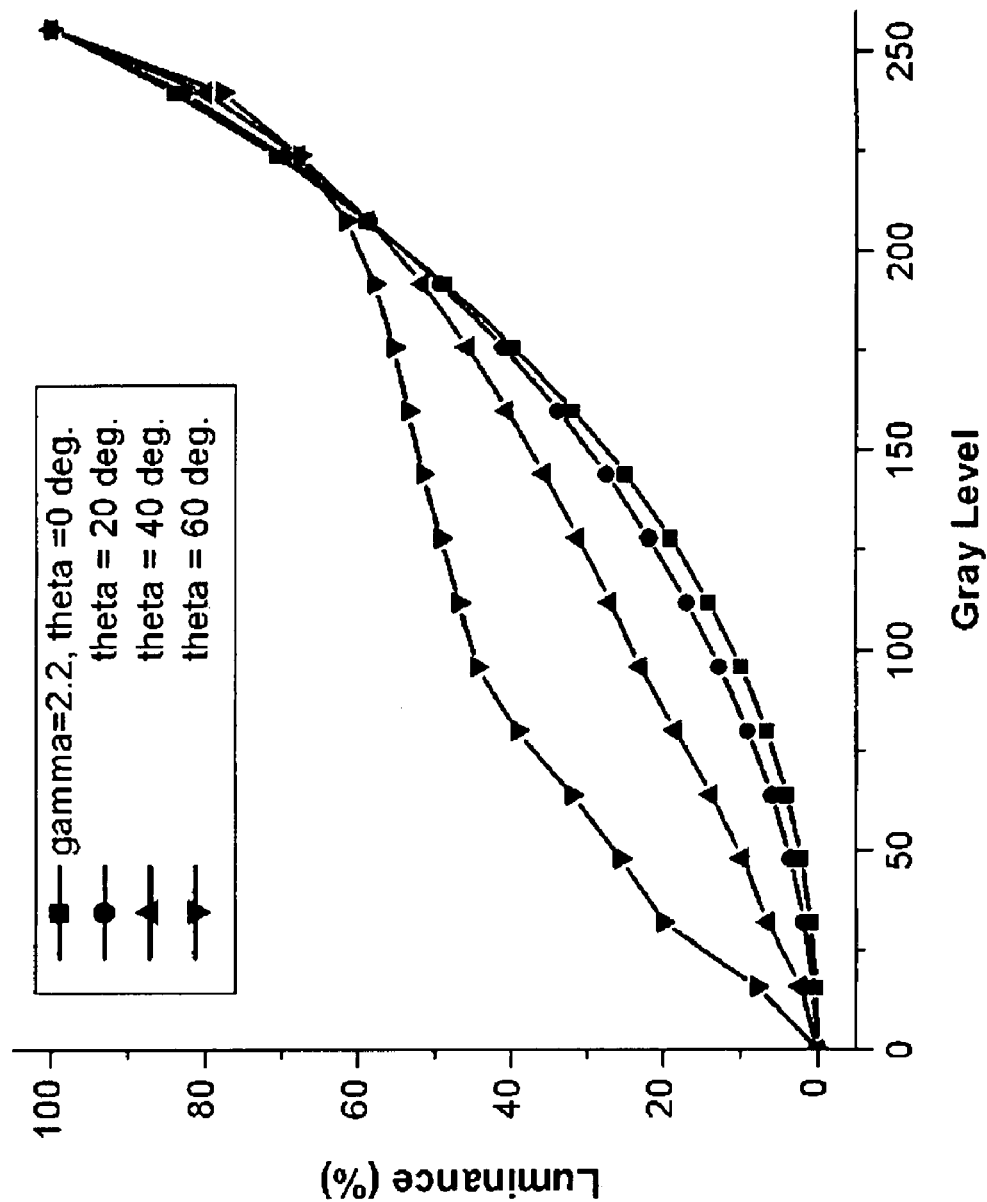
FIG. 5 shows the gamma curves of the conventional four-domain MVA LCD at different incident angles with a gamma correction factor $\gamma=2.2$.

FIG. 5 further plots the gamma curves of the main region 161 at different incident angles with a gamma correction factor γ=2.2 as a typical conventional four-domain MVA LCD example. At (θ, φ)=(60°, 0°) viewing direction, the corresponding D value is approximately 0.3510. Summarily, the configuration according to the present invention shows a 14.7% improvement over the conventional MVA LCD, which shows that the configuration has a better off-axis image quality.

Figure 6A:
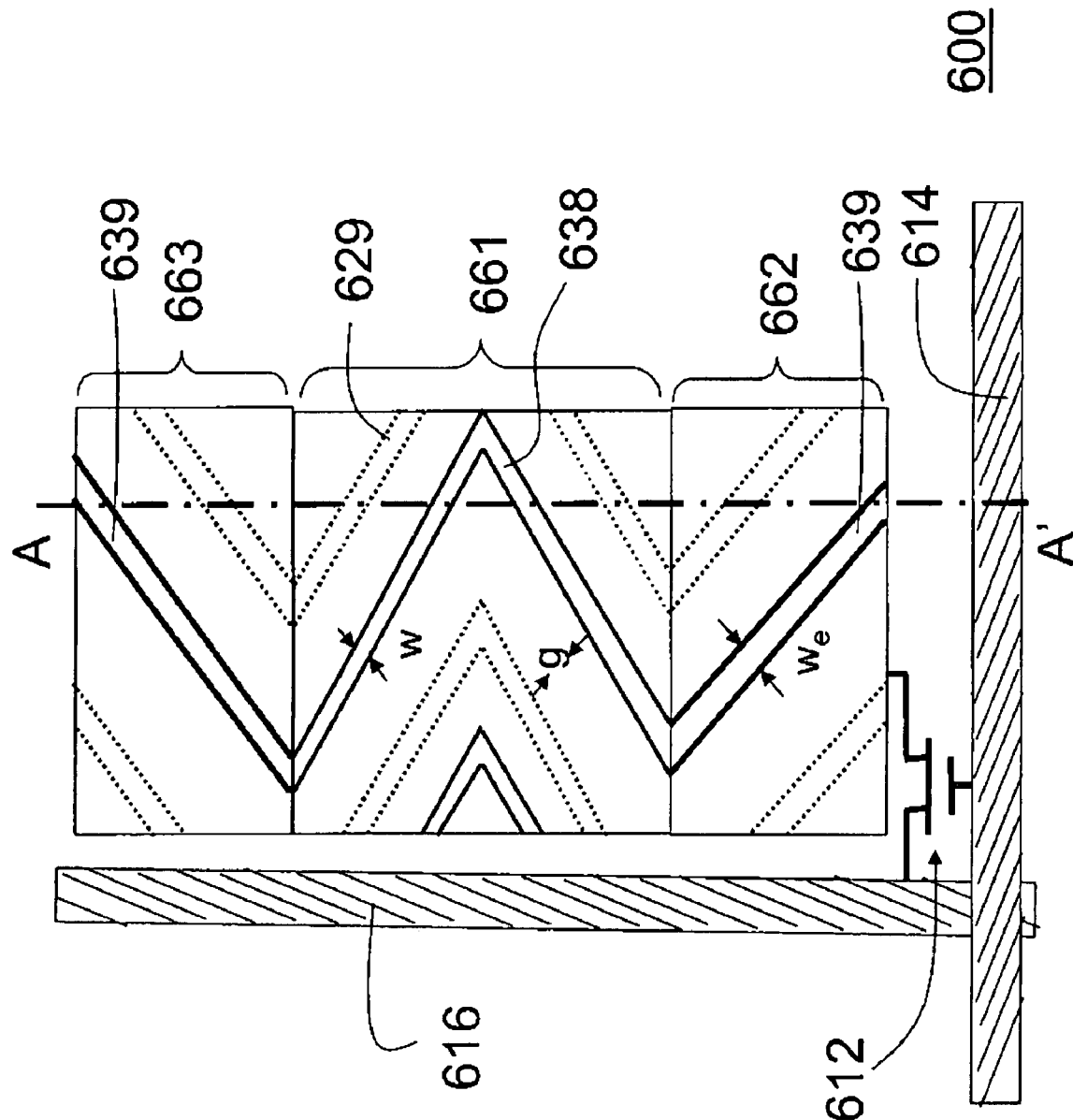
FIG. 6a shows a plane view of a MVA LCD panel with domain guiding slits according to another embodiment of the present invention.
Figure 6B:
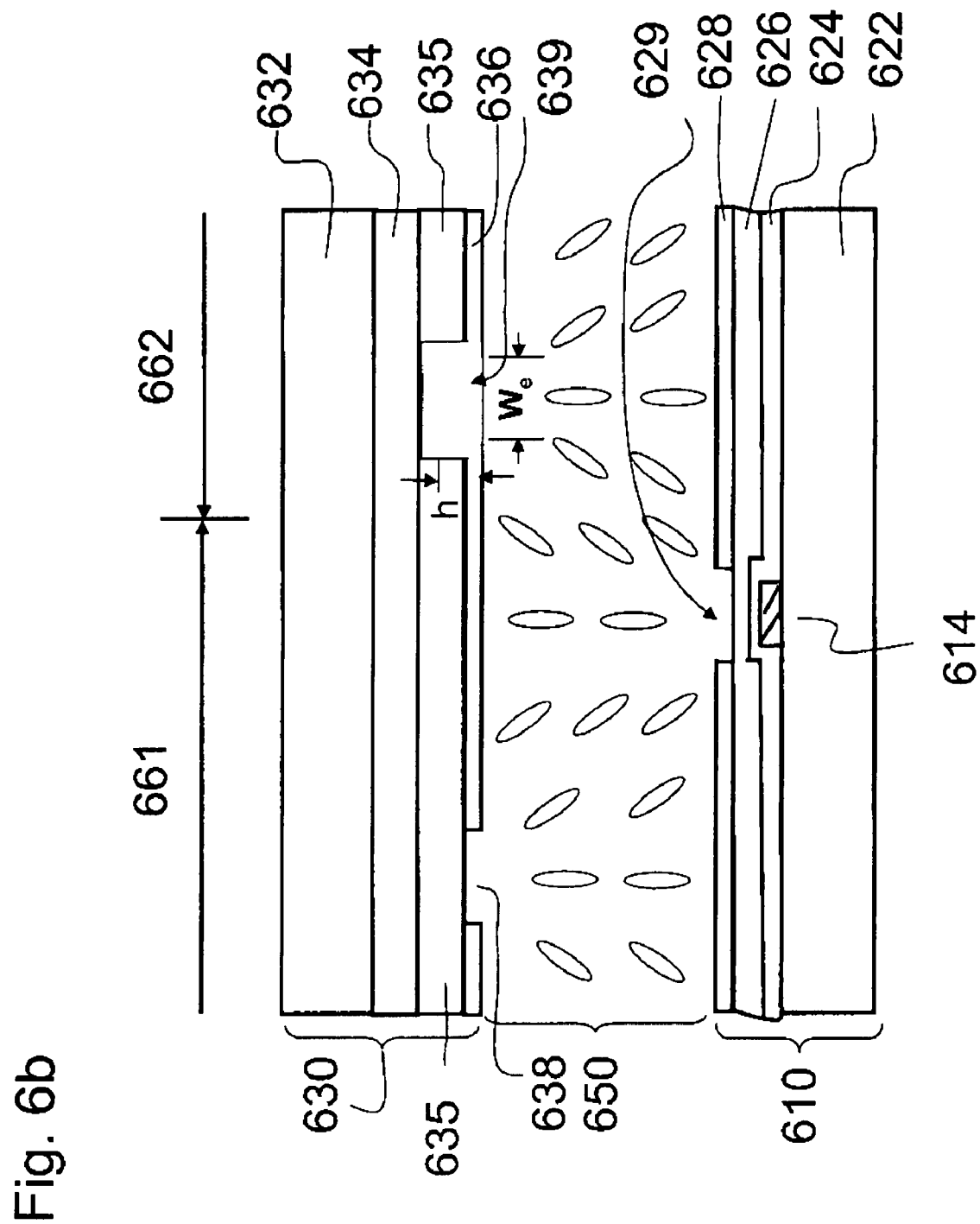

An alternative MVA LCD panel configuration shown in FIG. 6a and FIG. 6b, where FIG. 6a shows a plane view of the MVA LCD panel and FIG. 6b is the schematic cross-sectional view along line A-A' in FIG. 6A. Although the main elements in the configuration shown in FIGS. 1a and 1b are also used in this alternative configuration, new reference numerals are used. The primary difference between the two configurations is the use of pixel and common guiding slits in this alternative configuration.

Like the configuration shown in FIGS. 1a and 1b, the alternative configuration shown in FIGS. 6a and 6b, the MVA LCD includes a bottom substrate 610, a top substrate 630 and a liquid crystal layer 650 sandwiched therebetween. As shown in FIG. 6b, the bottom substrate 610 includes of a transparent substrate 622, a plurality of TFT 612, a plurality of scan lines 614, a plurality of data lines 616, a gate insulating layer 624, a passivation layer 626, and a plurality of pixel electrodes 628.

Each TFT 612 is deposited inside one of the unit pixel region 600 and is connected to the corresponding scan lines 614 and data lines 616 as shown in FIG. 6a. As in the previous example, the gate insulating layer 624 is formed to cover the scan lines 614, and the passivation layer 626 is formed to cover the date lines 616 over the transparent substrate 622. Both the gate insulating layer 624 and passivation layer 626 could be an organic material such as a-Si:C:O and a-Si:O:F, or an inorganic material such as silicon nitride ($SiN_x$) and silicon oxide ($SiO_2$) which is prepared by plasma enhanced chemical vapor deposition or other similar sputtering methods. Each pixel electrode 628 is electrically connected to a corresponding TFT 612. The transparent pixel electrode 628 is usually made of an electrically conductive material with high optical transparency, such as indium tin oxide (ITO), indium zinc oxide (IZO) or zinc oxide (ZnO). Unlike the configuration shown in FIG. 1b, each pixel electrode 628 has a plurality of domain guiding layers 629, which are the LC alignment slits formed by etching of transparent pixel electrode 628 to produce domain guiding layer slits 629 in the pixel electrode 628.

The top substrate 630 includes a transparent substrate 632, a color filter 634, an over-coating layer 635, a plurality of common electrode 636, a plurality of domain guiding layer 638, and a plurality of electric shielding layers 639. The over-coating layers 635 are disposed beneath the transparent substrate 632 to cover the color filtering layer 634. The material of the over-coating layer 635 can be an acrylic resin, polyamide, ployimide, or novolac epoxy resin. The over-coating layer 635 is patterned by a process employing photolithography and etching to form a plurality of partially etched regions, whose thickness is typically larger than 0.1 µm. Part of the un-etched regions (not shown) is thick enough to work as the cell spacer in order to simplify the manufacturing process and lower the manufacturing cost.

As previously described, each common electrode 636 is deposited over the over-coating layer 635. The transparent common electrode 636 is usually made of an electrically conductive material with high optical transparency, such as indium tin oxide (ITO), indium zinc oxide (IZO) or zinc oxide (ZnO). The electric shielding layers 639 are deposited to fill the partially etched regions on the over-coating layer 635 and the common electrode 636. The electric shielding layer 639 could be an organic material such as a-Si:C:O and a-Si:O:F, or an inorganic material such as silicon nitride ($SiN_x$) and silicon oxide ($SiO_2$), which is prepared by plasma enhanced chemical vapor deposition or other similar sputtering methods commonly known in the art. Unlike the configuration shown in FIG. 1b, each common electrode 636 has a plurality of domain guiding layer 638, which are the LC alignment slits formed by the opening patterns through the etching of transparent common electrode 636.

During simulation, a repeated unit pixel size of the MVA LCD structure with 100 µm×600 µm, and the slit-type domain guiding layers 629 and 638 having zigzag shapes with width of approximately w=12 µm and a gap between the neighboring domain guiding layers on the projection plane of approximately g=35 µm. In this example, the electric shielding layer 639 is made of SiN, which is flat and has width of approximately $w_e$=12 µm and height of approximately h=1.2 µm at the dielectric constant of 7.0. The two tilted electric shielding layers 639 resided regions are sub region 662 and sub region 663 as shown in FIG. 6a. The area ratio between the main region 661 and the sub regions 662 and 663 was selected to be approximately 1:1. The cell gap between the top and bottom substrates is approximately 4 µm. In this example, as Merck negative $\Delta\in$ LC mixture MLC-6608 (birefringence $\Delta$n=0.083 at λ=550 nm, dielectric anisotropy $\Delta\in$=−4.2 and rotational viscosity $\gamma_1$=0.186 Pa·s) is aligned vertical to the substrates in the initial state. Its azimuthal angle is approximately 0° and pretilt angle is approximately 90°.

Figure 7:
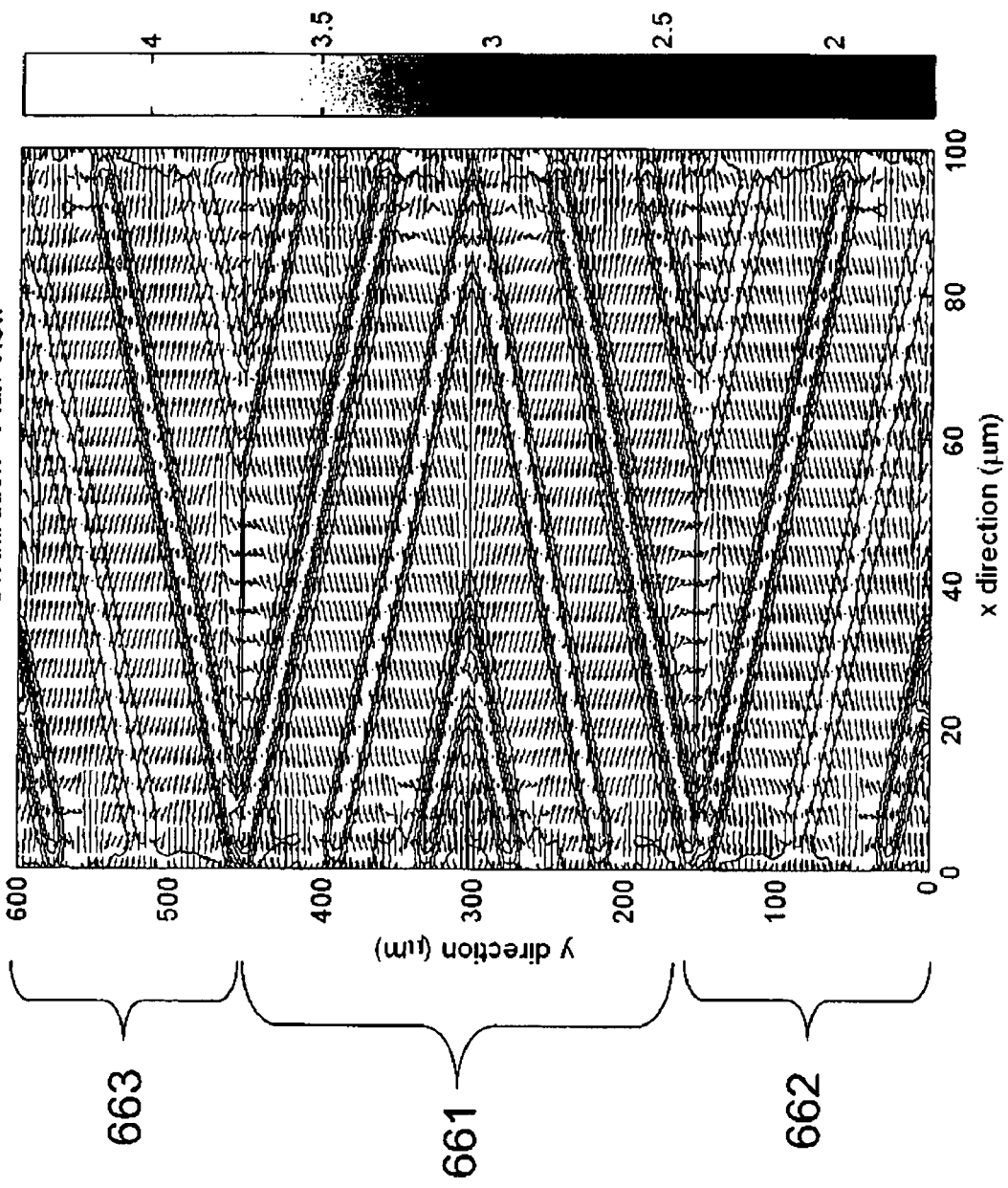
FIG. 7 shows the simulated LC director distribution of the MVA LCD panel shown in FIGS. 6a and 6b when the applied voltage is 6 $V_{rms}$.

FIG. 7 shows the simulated LC director distribution of this embodiment when the applied voltage is approximately 6 $V_{rms}$ between the common electrodes 636 and pixel electrodes 628. The distribution shown is the plane view cut from the center of the pixel unit along the Z-axis direction. As shown, the LC directors are reoriented perpendicular to the electric field direction due to the fringing field and the longitudinal electric field between the bottom substrate 610 and the top substrate 630. With the aid of the pixel and common electrode domain guiding slit layers 629 and 638, respectively, a typical four-domain structure is formed in the main region 661. In the sub regions 662 and 663, the electric shielding layers 639 help to form additional four domains.

Therefore, a total of eight LC domains are formed in the whole pixel 600 under the application of an external electric field from the TFT 612. This eight-domain MVA LCD can enhance the viewing angle of the panel provided that a set of optimized phase compensation films are employed.

Figure 8:
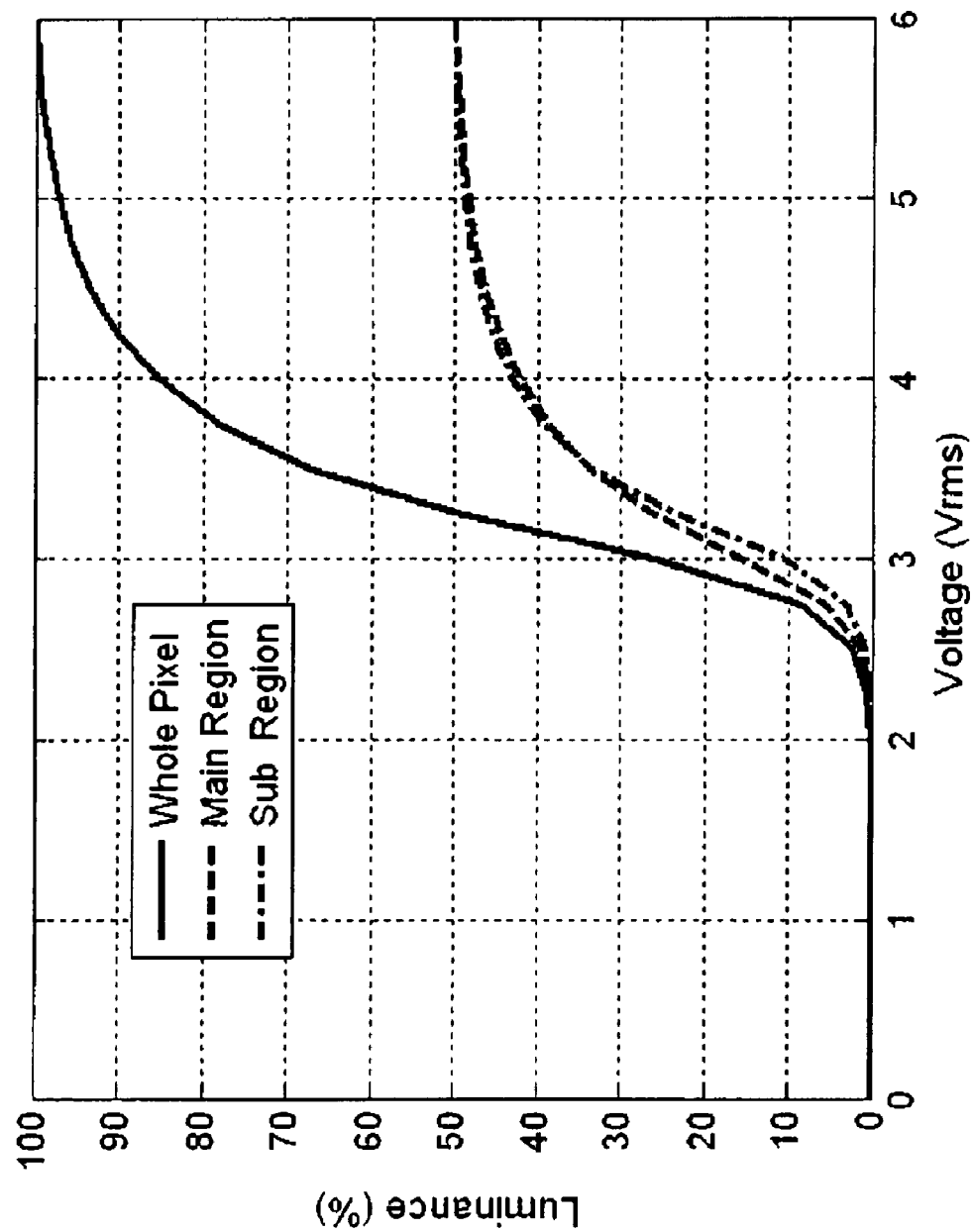
FIG. 8 shows the voltage-dependent luminance curves of the MVA LCD panel shown in FIGS. 6a and 6b.

FIG. 8 shows the voltage-dependent luminance curves through the entire pixel 600, the main region 661 and the sub regions 662 and 663, respectively. The incident white light source in this example is from a conventional cold cathode fluorescent lamp (CCFL) backlight, passing through the RGB color filters before entering the MVA LCD panel which is sandwiched between two crossed linear polarizers (not shown). The threshold voltage of the main region 661 is approximately 2.25 $V_{rms}$ and the sub region is approximately 2.32 $V_{rms}$. The increased threshold voltage is because the electric shielding layers 639 screen a portion of the electric field. Therefore, the sub regions 662 and 663 have a lower luminance than the main region 661 under the same gray level defined by the entire pixel 600.

Figure 9:
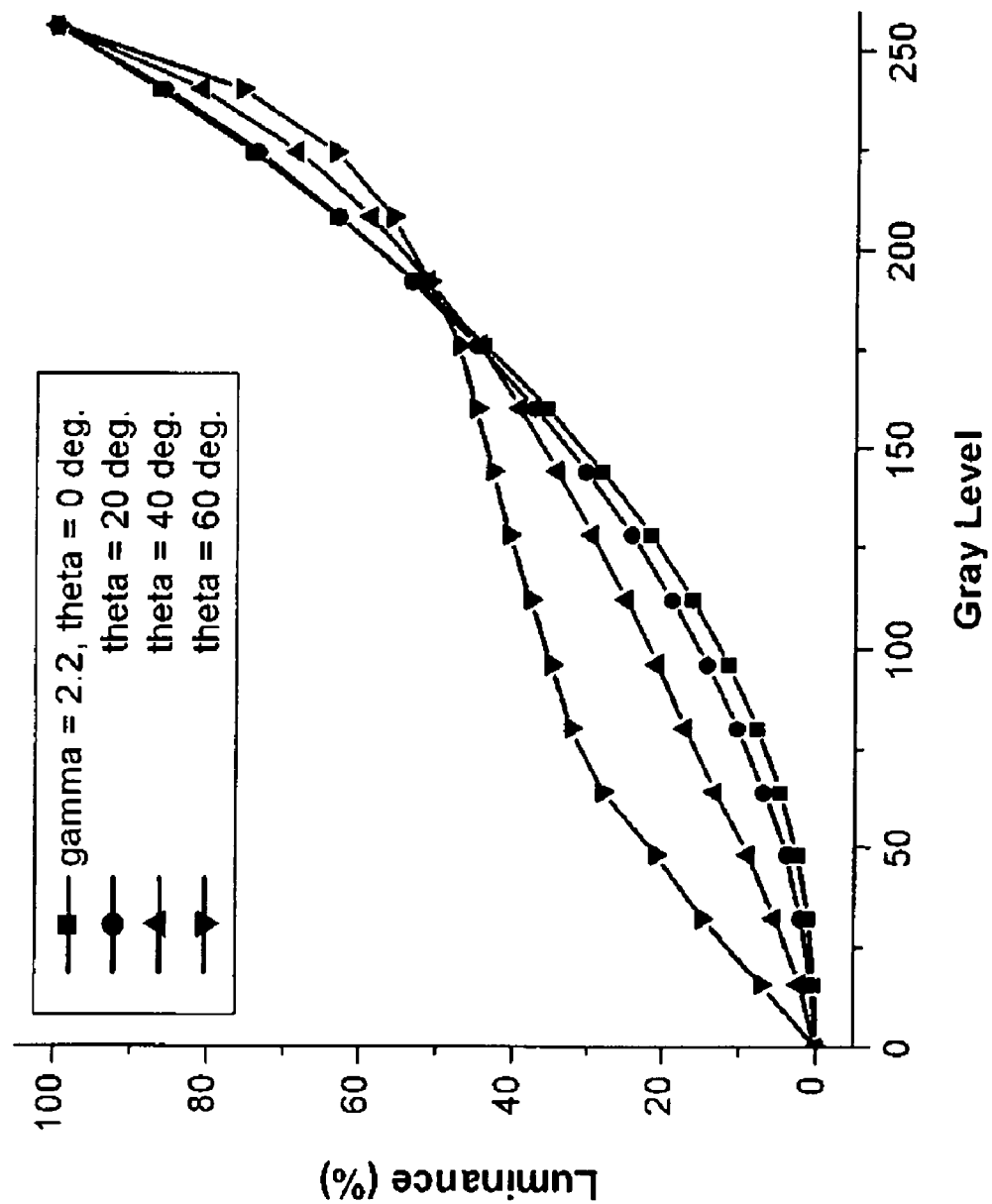
FIG. 9 shows the typical gamma curves at different incident angles with a gamma correction factor $\gamma=2.2$ for the MVA LCD panel shown in FIGS. 6a and 6b.

FIG. 9 is a plot of the typical gamma curves of the whole pixel 600 at different incident angles with a gamma correction factor γ=2.2 in this example. As shown, the azimuthal angle is set at 0° and an 8-bit grayscale with 256 gray levels is evaluated. As calculated from Eq. 1, its D value is 0.2771 at the (θ, φ)=(60°, 0°) viewing direction.

In comparison, the typical conventional four-domain MVA LCD has a D value of 0.3510. This configuration of the present invention shows a 21% improvement over the conventional MVA LCD, which indicates an improved off-axis image quality.

Figure 10A:
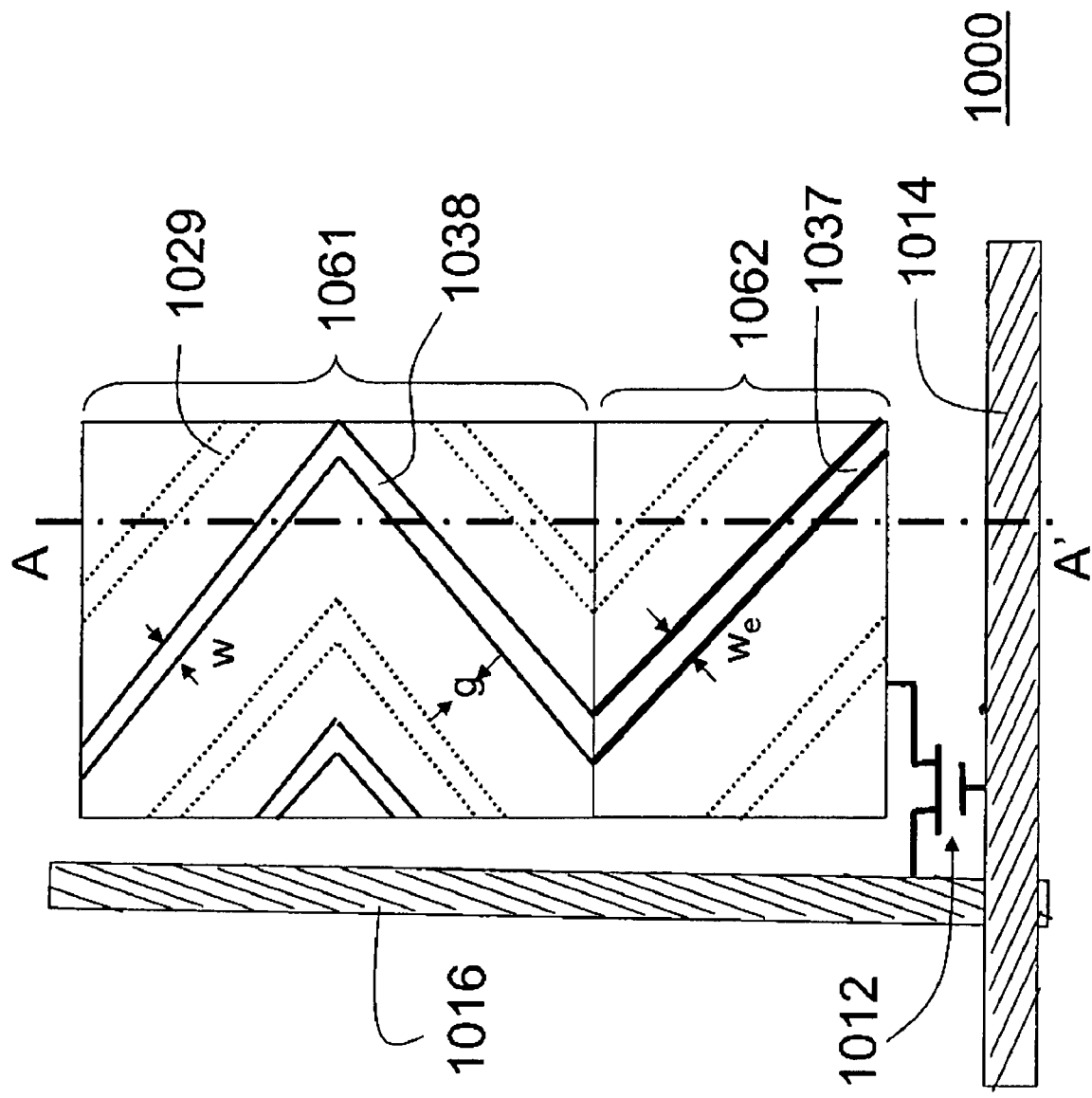
FIG. 10a shows a plane view of a MVA LCD panel of another embodiment of the present invention.
Figure 10B:
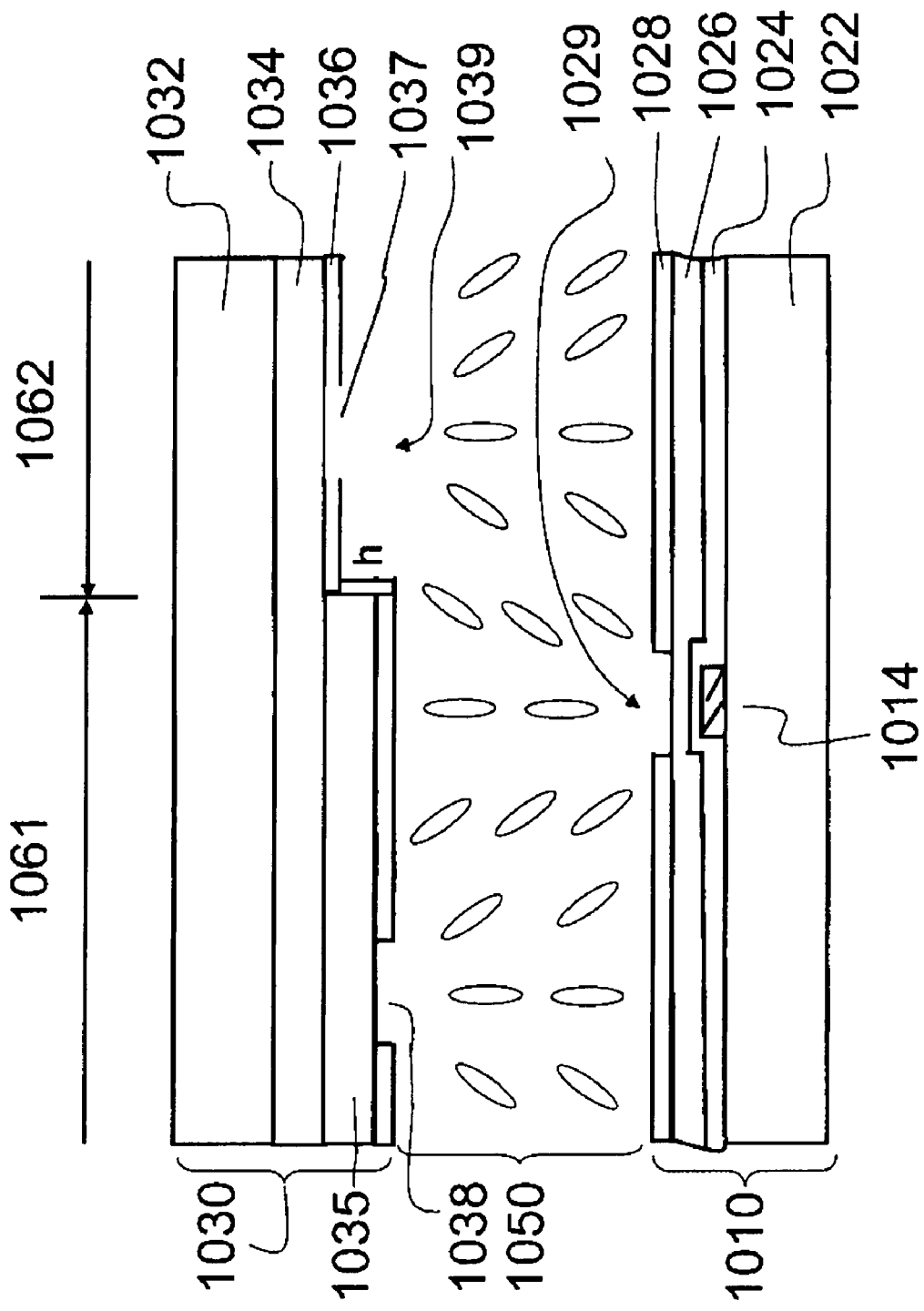

An alternative MVA LCD panel configuration is shown in FIG. 10a and FIG. 10b, where FIG. 10a shows a plane view of the MVA LCD panel and FIG. 10b is the schematic cross-sectional view along line A-A' in FIG. 10a. Although the main elements in the configuration shown in FIGS. 1a and 1b and 6a and 6b are also used in this alternative configuration, new reference numerals are assigned for this example. Like the example shown in FIGS. 6a and 6b, the configuration shown in FIGS. 10a and 10b include pixel and common electrode domain guiding slits 1029 and 1038, respectively. The primary difference is the use of pixel and common guiding slits in this alternative configuration.

Like the configuration shown in FIGS. 1a and 1b, in the alternative configuration shown in FIGS. 10a and 10b the MVA LCD panel 1000 includes a bottom substrate 1010, a top substrate 1030 and a liquid crystal layer 1050 sandwiched therebetween. The bottom substrate 1010 includes a transparent substrate 1022, a plurality of TFT 1012, a plurality of scan lines 1014, a plurality of data lines 1016, a gate insulating layer 1024, a passivation layer 1026, and a plurality of pixel electrodes 1028 as shown in FIG. 10b. Each TFT 1012 is deposited inside one of the unit pixel region 1000 and is connected to the corresponding scan lines 1014 and data lines 1016 as shown in FIG. 10a. The gate insulating layer 1024 is formed to cover the scan lines 1014, and the passivation layer 1026 is formed to cover the data lines 1016 over the transparent substrate 1022 which can be made of a transparent glass. Both the gate insulating layer 1024 and passivation layer 1026 may be an organic material such as a-Si:C:O and a-Si:O:F, or an inorganic material such as silicon nitride ($SiN_x$) and silicon oxide ($SiO_2$) which is prepared by plasma enhanced chemical vapor deposition or other similar sputtering methods commonly known in the art.

As previously described, each pixel electrode 1028 is electrically connected to a corresponding TFT 1012 and the transparent pixel electrode 1028 is usually made of an electrically conductive material with high optical transparency, such as indium tin oxide (ITO), indium zinc oxide (IZO) or zinc oxide (ZnO). Each pixel electrode 1028 has a plurality of domain guiding layer 1029, which are the LC alignment slits formed by the opening patterns through the etching of transparent pixel electrode 1028.

The top substrate 1030 includes of a transparent substrate 1032, a color filter 1034, a plurality of over-coating layer 1035, a plurality of common electrode 1036, a plurality of domain guiding layer 1037, a plurality of domain guiding layer 1038, and a plurality of electric shielding layer 1039. The over-coating layer 1035 is disposed beneath the transparent substrate 1032 to cover the color filtering layer 1034. The material of the over-coating layer 1035 can be an acrylic resin, polyamide, ployimide, or novolac epoxy resin. The over-coating layer 1035 is patterned by a process employing photolithography and etching to form a plurality of partially etched regions, whose thickness is typically larger than 0.1 µm. The un-etched region is the main region 1061 and the etched region is the sub region 1062.

Each common electrode 1036 is deposited over the over-coating layer 1035 and the etched sub region 1062. The transparent common electrode 1036 is usually made of an electrically conductive material with high optical transparency, such as indium tin oxide (ITO), indium zinc oxide (IZO) or zinc oxide (ZnO). The electric shielding layers 1039 are deposited to fill the etched sub region 1062 on the common electrode 1036. The electric shielding layer 1039 may be comprised of an organic material such as a-Si:C:O and a-Si:O:F, or an inorganic material such as silicon nitride ($SiN_x$) and silicon oxide ($SiO_2$), which is prepared by plasma enhanced chemical vapor deposition or other similar sputtering methods commonly know in the art. As shown in FIG. 10b, each common electrode 1036 has a plurality of domain guiding layer 1038 in main region 1061 and a plurality of domain guiding layer 1037 in sub region 1062, which are the LC alignment slits formed by the opening patterns through the etching of transparent common electrode 1036.

During simulation, the repeated unit pixel size of the MVA LCD structure was set at approximately 100 µm×450 µm and the domain guiding layers 1029 and 1038 are the zigzag shaped ones with width of approximately w=12 µm. The gap between the neighboring domain guiding layers on the projection plane is approximately g=35 µm. The electric shielding layer 1039 is flat with a height of approximately h=1.2 µm and a dielectric constant of 3.5. The electric shielding layer 1039 covers the sub region 1062 and the domain guiding layer 1037 has a width of approximately $w_e$=12 µm in sub region 1062. The area ratio between the main region 1061 and the sub region 1062 is selected at approximately 2:1. The cell gap between the top and bottom substrates is approximately 4 µm. In this example, a Merck negative $\Delta \in$ LC mixture MLC-6608 (birefringence $\Delta n$=0.083 at $\lambda$=550 nm, dielectric anisotropy $\Delta \in$=−4.2 and rotational viscosity $\gamma_1$=0.186 Pa·s) is aligned vertical to the top and bottom substrates in the initial state. Its azimuthal angle is approximately 0° and pretilt angle is approximately 90°.

Figure 11:
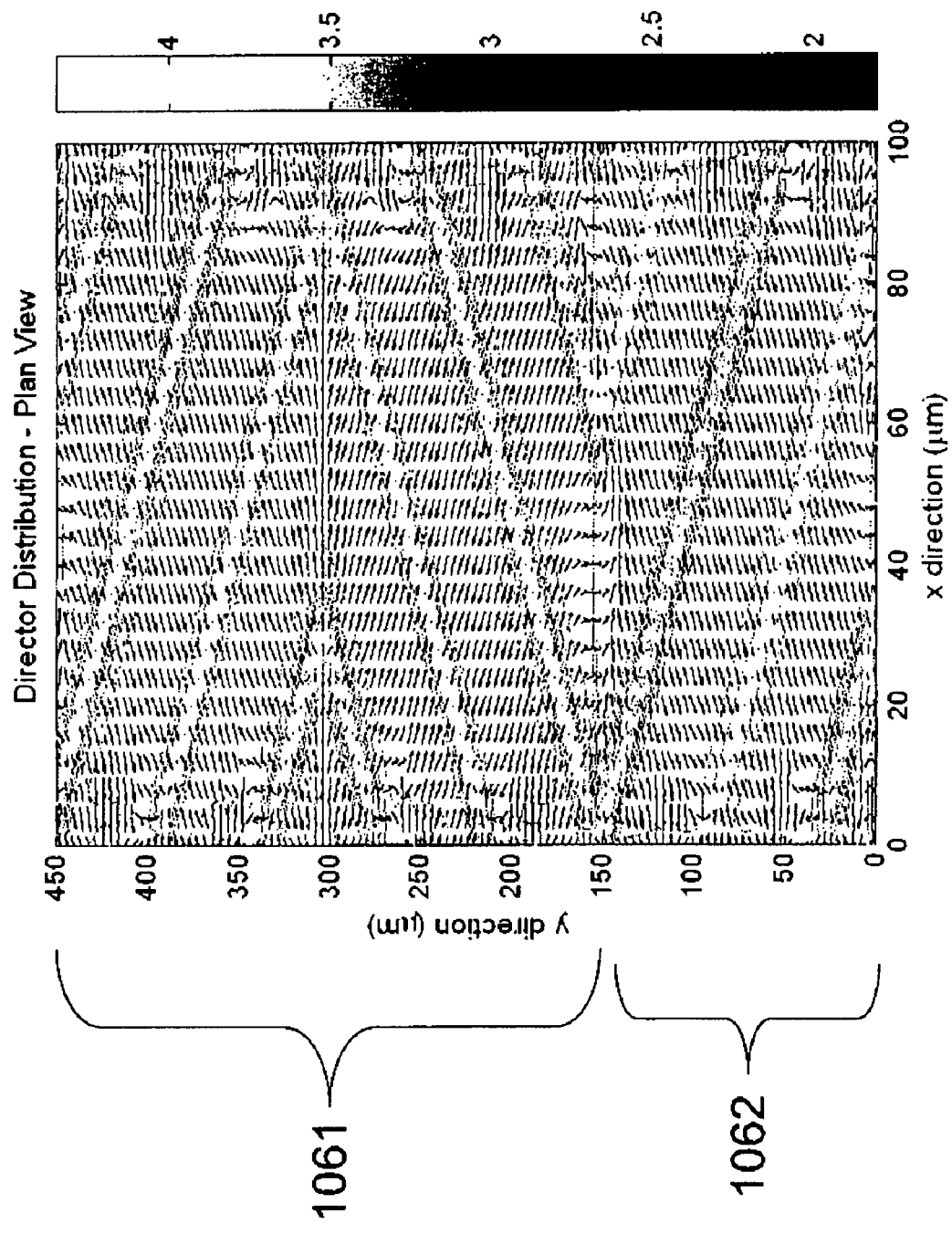
FIG. 11 shows the simulated LC director distribution of the MVA LCD panel shown in FIGS. 10a and 10b when the applied voltage is 6 $V_{rms}$.

FIG. 11 shows the simulated LC director distribution of this embodiment when an external voltage V=6 $V_{rms}$ is applied between the common electrodes 1036 and pixel electrodes 1028. The distribution shown is the plane view cut from the center of the pixel unit along the Z-axis direction. As shown, the LC directors are reoriented perpendicular to the electric field direction due to the fringing field and the longitudinal electric field between the bottom substrate 1010 and the top substrate 1030. With the aid of the domain guiding slit layers 1029 and 1038, a typical four domain structure is formed in the main region 1061. In the sub region 1062, the tilted domain guiding slit layer 1037 and the electric shielding layer 1039 forms an additional two domains. Therefore, a total of six domains are formed in the whole pixel 1000 under the application of an external electric field from the TFT 1012. This six-domain MVA LCD would enhance the viewing angle of the display panel.

Figure 12:
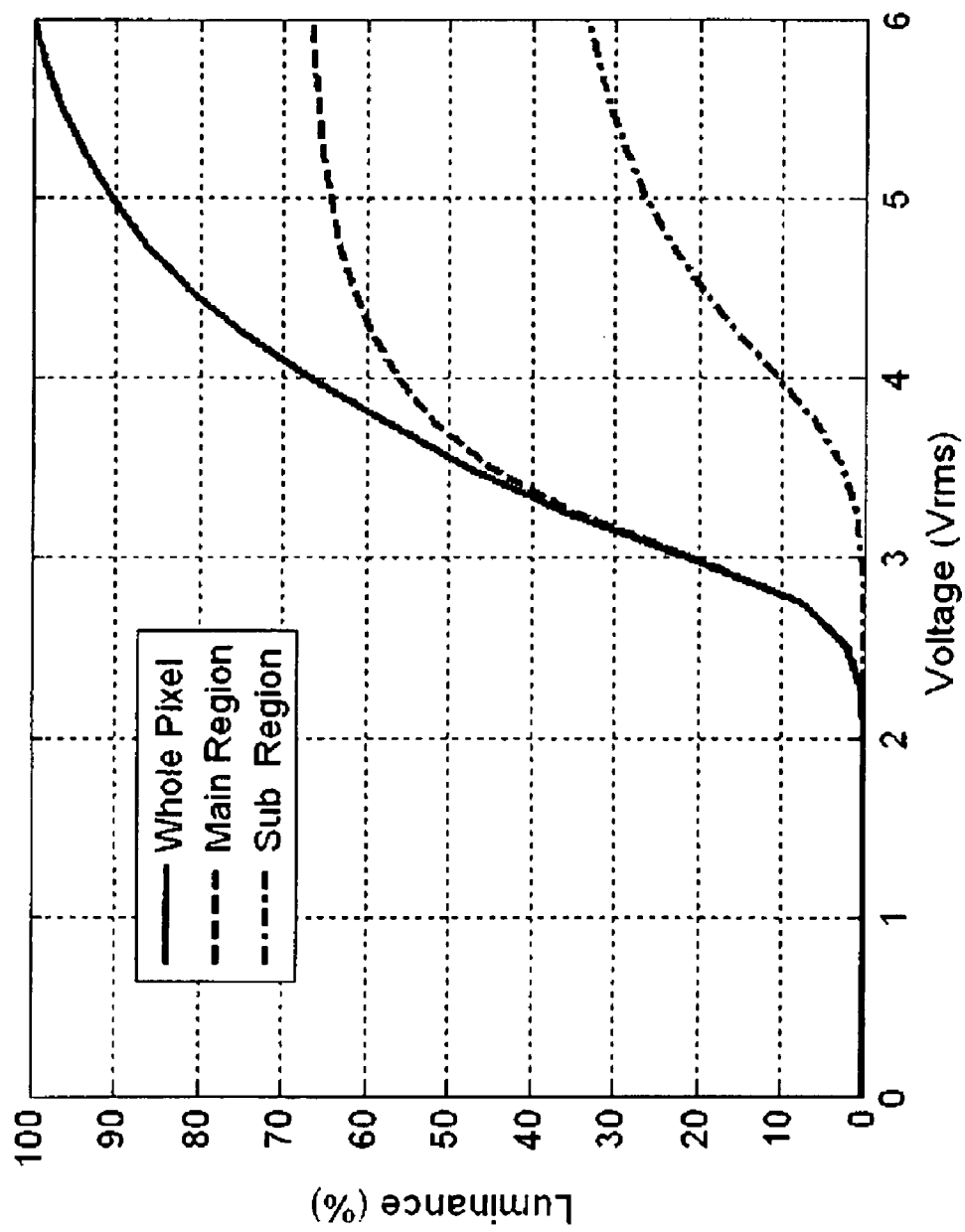
FIG. 12 shows the voltage-dependent luminance curves for the MVA LCD panel shown in FIGS. 10a and 10b.

FIG. 12 shows the voltage-dependent luminance curves through the whole pixel 1000, the main region 1061 and the sub region 1062, respectively. The incident white light source is from a conventional cold cathode fluorescent lamp (CCFL) backlight, passing through the RGB color filters before entering the MVA LCD panel with the crossed linear polarizers. The threshold voltage of the main region 1061 is 2.25 $V_{rms}$ while the sub region is 3.00 $V_{rms}$. The electric shielding layers 1039 effectively screen a part of the electric field so that the corresponding threshold voltage increases. Therefore, the sub region 1062 has a lower luminance than the main region 1061 under the same gray level defined by the whole pixel 1000.

Figure 13:
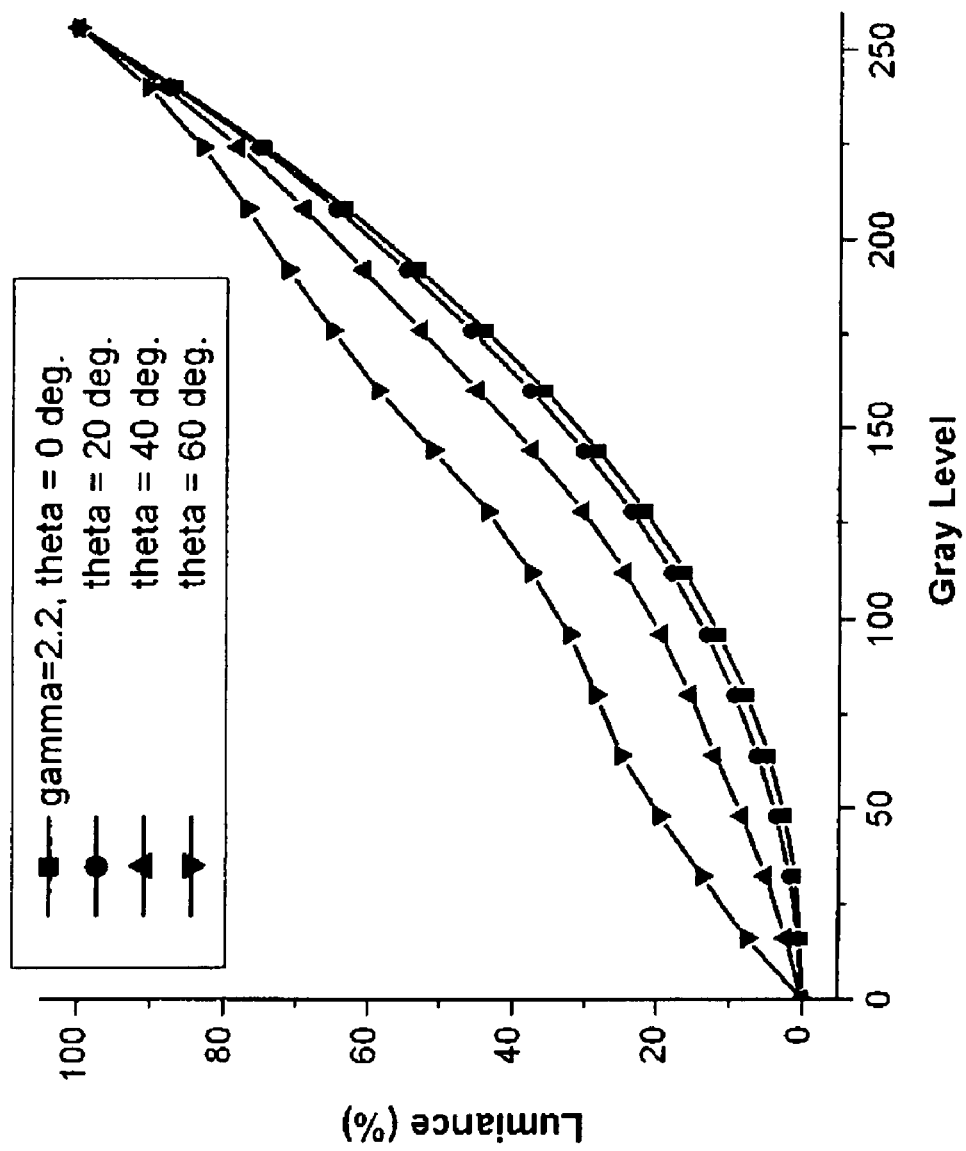
FIG. 13 shows the typical gamma curves at different incident angles with a gamma correction factor $\gamma=2.2$ in MVA LCD panel shown in FIGS. 10a and 10b.

FIG. 13 is a plot of the typical gamma curves of the whole pixel 1000 at different incident angles with a gamma correction factor $\gamma$=2.2 in the present embodiment. Here, the azimuthal angle is 0° and an 8-bit grayscale with 256 gray levels was evaluated. As calculated from Eq. 1, its D value is 0.2866 at the $(\theta, \phi)$=(60°, 0°) viewing direction. By contrast, the conventional four-domain MVA LCD has a D value of 0.3510. The configuration in this example exhibits an 18.4% improvement over the conventional MVA LCD, indicating that the proposed embedment has a better off-axis image quality.

Figure 14A:
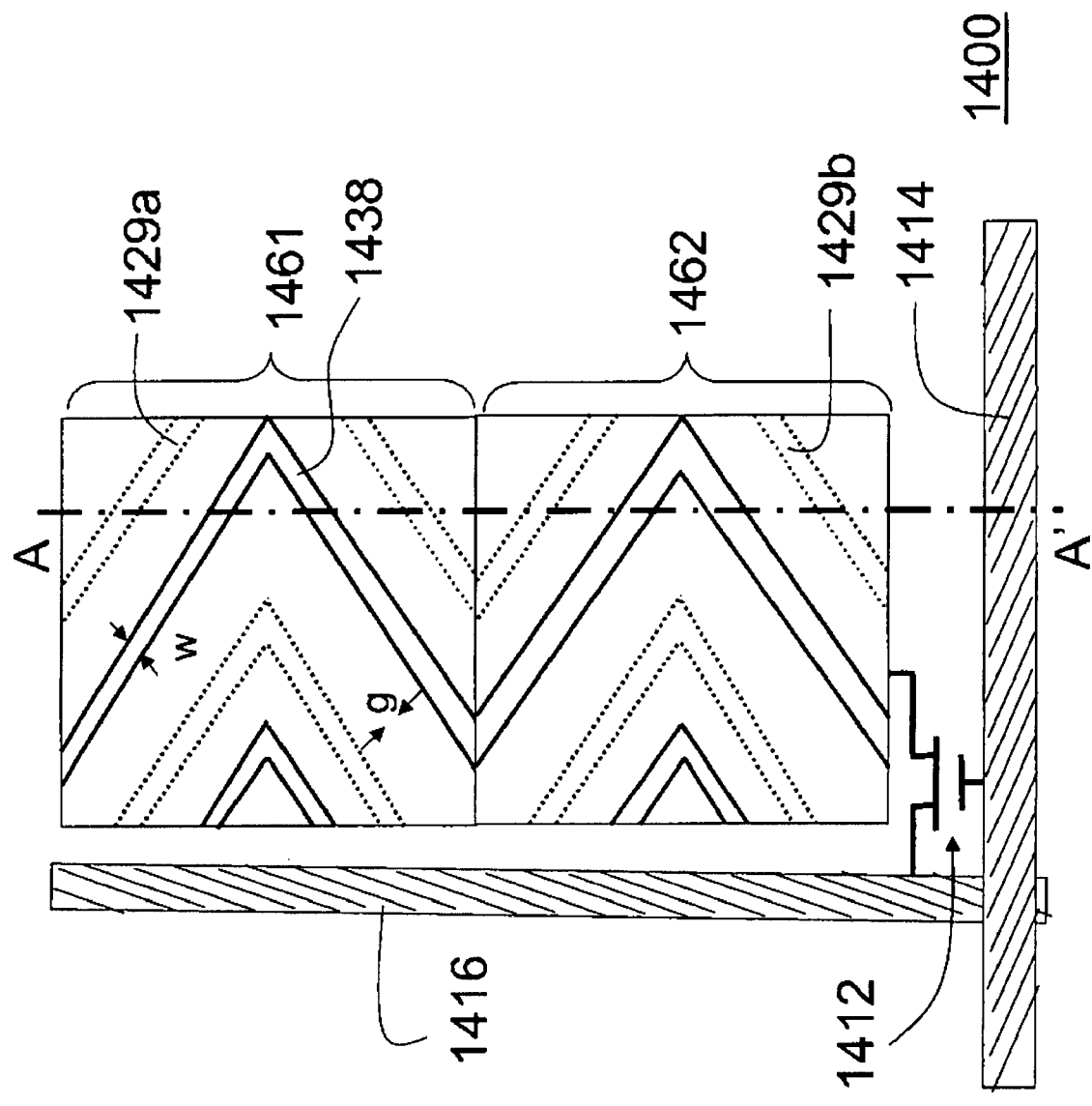
FIG. 14a shows a plane view of a MVA LCD panel of yet another embodiment of the present invention.
Figure 14B:
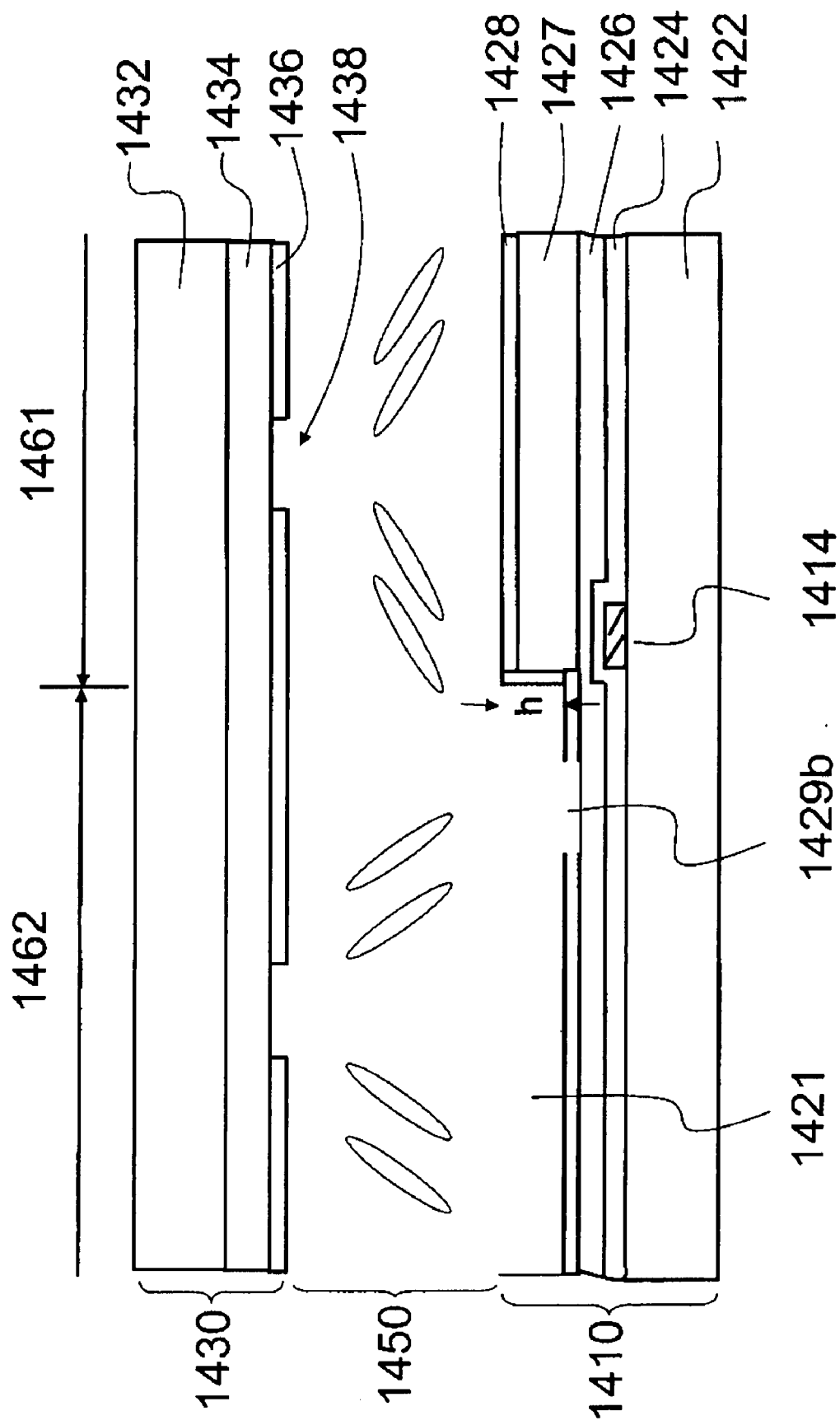

An alternative MVA LCD panel configuration is shown in FIG. 14a and FIG. 14b, where FIG. 14a shows a plane view of the MVA LCD panel and FIG. 14b is the schematic cross-sectional view along line A-A' in FIG. 14a. Although the main elements in the configuration shown in FIGS. 1a and 1b, 6a and 6b and 10a and 10b are also used in this alternative configuration, new reference numerals are assigned for this example. Like the example shown in FIGS. 10a and 10b, this configuration includes pixel and common electrode domain guiding slits 1429 and 1438, respectively.

As shown in FIGS. 14a and 14b, the MVA LCD panel includes a bottom substrate 1410, a top substrate 1430 and a liquid crystal layer 1450. The bottom substrate 1410 has a transparent substrate 1422, a plurality of TFT 1412, a plurality of scan lines 1414, a plurality of data lines 1416, a gate insulating layer 1424, a passivation layer 1426, a plurality of over-coating layer 1427, a plurality of pixel electrodes 1428, a plurality of domain guiding layer 1429a and 1429b, and a plurality of electric shielding layer 1421 fabricated on an interior surface of the transparent substrate 1422 adjacent to the LC layer 1450.

Each TFT 1412 is deposited inside one of the unit pixel region 1400 and is connected to the corresponding scan lines 1414 and data lines 1416 as shown in FIG. 14a. The gate insulating layer 1424 is formed to cover the scan lines 1414, and the passivation layer 1426 is formed to cover the data lines 1416 over the transparent substrate 1422 as shown in FIG. 14b. Both the gate insulating layer 1424 and passivation layer 1426 may be an organic material such as a-Si:C:O and a-Si:O:F, or an inorganic material such as silicon nitride ($SiN_x$) and silicon oxide ($SiO_2$), prepared by plasma enhanced chemical vapor deposition or other similar sputtering methods commonly known in the art.

Unlike the previous examples, the over-coating layer 1427 is disposed above the passivation layer 1426 on the bottom substrate. The material of the over-coating layer 1427 could be an acrylic resin, polyamide, ployimide, or novolac epoxy resin. The over-coating layer 1427 is patterned by a photolithographic and etching process to form a plurality of partially etched regions, whose thickness is typically larger than 0.1 μm. The un-etched region is specifically the main region 1461 and the etched region is specifically the sub region 1462. Each pixel electrode 1428 is deposited over the over-coating layer 1427 and the etched sub region 1462. The transparent pixel electrode 1428 is usually made of an electrically conductive material with high optical transparency, such as indium tin oxide (ITO), indium zinc oxide (IZO) or zinc oxide (ZnO).

Each pixel electrode 1428 has a plurality of domain guiding layer 1429a in the main region 1461 and a plurality of domain guiding layer 1429b in the sub region 1462, which are the LC alignment slits formed by the opening patterns through the etching of transparent pixel electrode 1428. The electric shielding layers 1421 are deposited to fill the etched sub region 1462 on the pixel electrode 1428. The electric shielding layer 1421 may be comprised of organic materials such as a-Si:C:O and a-Si:O:F, or inorganic materials such as silicon nitride ($SiN_x$) and silicon oxide ($SiO_2$), which is prepared by plasma enhanced chemical vapor deposition or other similar sputtering methods.

The top substrate 1430 includes a transparent substrate 1432, a color filter 1434, a plurality of common electrode 1436, and a plurality of domain guiding layer 1438. Each common electrode 1436 has a plurality of domain guiding layer 1438, which are the LC alignment slits formed by the opening patterns through the etching of transparent common electrode 1436.

In this example, a repeated unit pixel size of the MVA LCD structure with approximately 100 μm×600 μm, and the slit-type domain guiding layers 1429a, 1429b and 1438 have zigzag shapes with width of approximately w=12 μm was selected. The gap between the neighboring domain guiding layers on the projection plane is approximately g=35 μm. The flat electric shielding layers 1421 is has a height of approximately h=1.2 μm at the dielectric constant of 3.5. The area ratio between the main region 1461 and the sub region 1462 is selected to be 1:1. The cell gap between the top and bottom substrates is approximately 4 μm and a Merck negative $\Delta \in$ LC mixture MLC-6608 (birefringence Δn=0.083 at λ=550 nm, dielectric anisotropy $\Delta \in$=−4.2 and rotational viscosity $\gamma_1$=0.186 Pa·s) is aligned vertical to the substrates in the initial state. Its azimuthal angle is 0° and pretilt angle is 90°.

Figure 15:
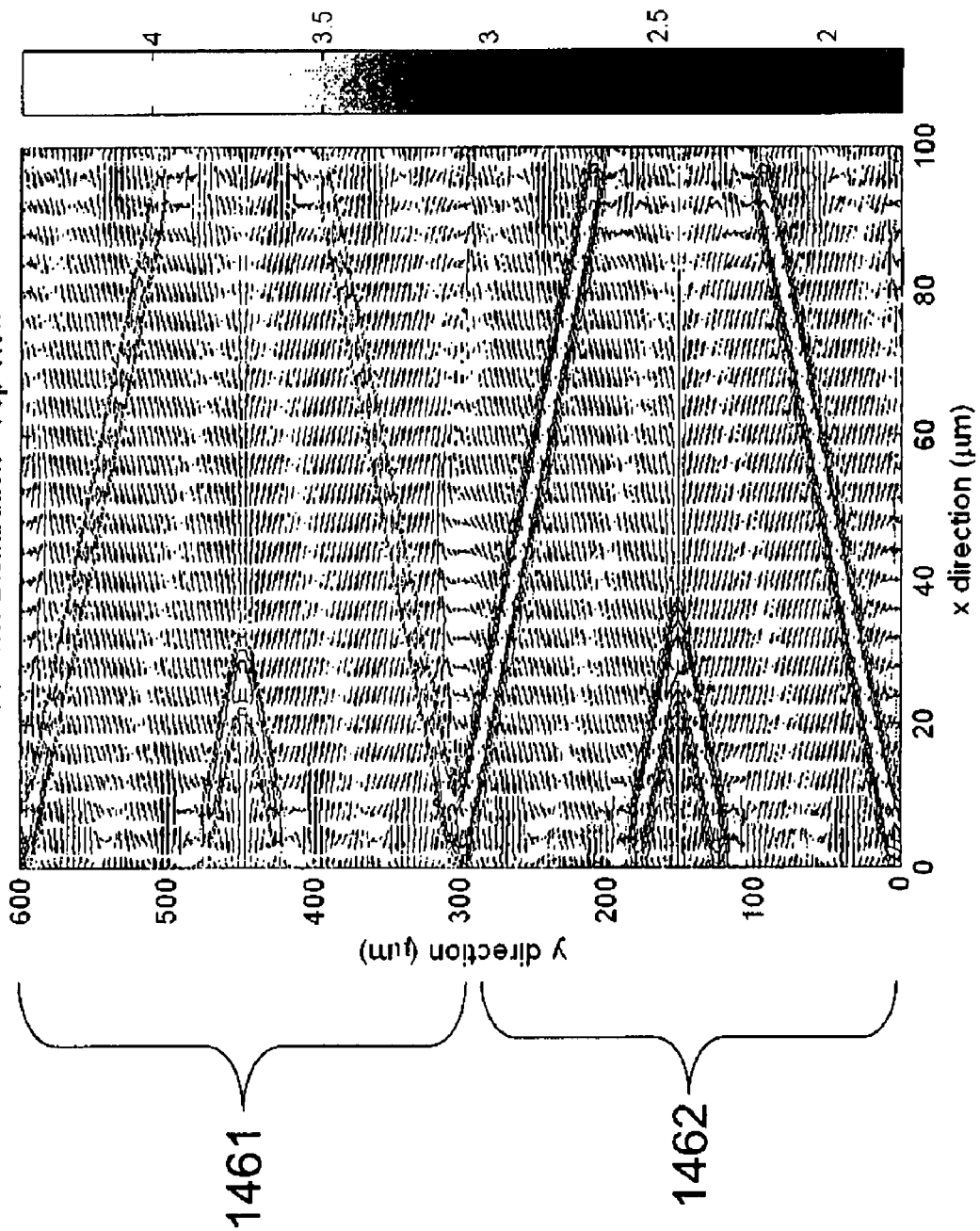
FIG. 15 shows the simulated LC director distribution in the MVA LCD panel shown in FIGS. 14A and 14b when the applied voltage is 6 $V_{rms}$.

FIG. 15 shows the simulated LC director distribution of this embodiment when the applied voltage is approximately 6 $V_{rms}$ between the common electrodes 1436 and pixel electrodes 1428. The distribution is the plane view cut from the center of the pixel unit along the Z-axis direction. The LC directors are reoriented perpendicular to the electric field direction due to the fringing field and the longitudinal electric field between the bottom substrate 1410 and the top substrate 1430. With the aid of the domain guiding slit layers 1429a, 1429b and 1438, a typical four-domain structure is formed in both the main region 1461 and the sub region 1462. Due to the electric field screening effect from the electric shielding layer 1421, these two four domain structures in the main region 1461 and sub region 1462 are different. Therefore, a total of eight domains are formed in the whole pixel 1400 under the application of an external electric field from the TFT 1412. This eight-domain MVA LCD would provide a wider viewing angle.

Figure 16:
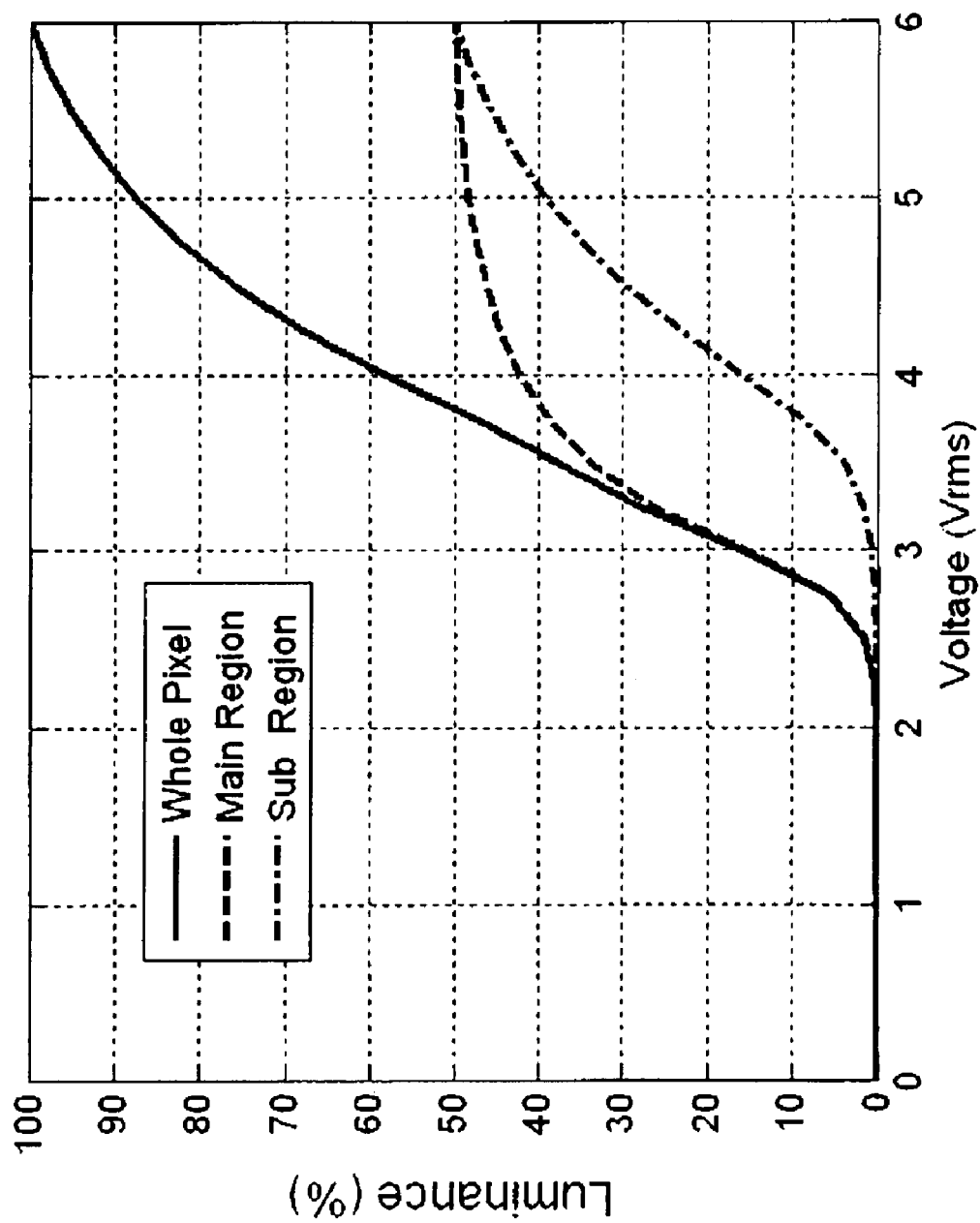
FIG. 16 shows the voltage-dependent luminance curves of the MVA LCD panel shown in FIG. 14a and 14b.

FIG. 16 shows the voltage-dependent luminance curves through the entire pixel 1400, the main region 1461 and the sub region 1462, respectively. The incident white light source is from a conventional cold cathode fluorescent lamp backlight, passing through the RGB color filters before entering the MVA LCD panel which is sandwiched between two crossed linear polarizers. The threshold voltage of the main region 1461 is 2.25 $V_{rms}$ while the sub region 1462 is 2.80 $V_{rms}$. Due to the existence of the electric shielding layers 1421, the threshold voltage in the sub region is increased noticeably. Therefore, the sub region 1462 has a lower luminance than the main region 1461 under the same gray level defined by the whole pixel 1400.

Figure 17:
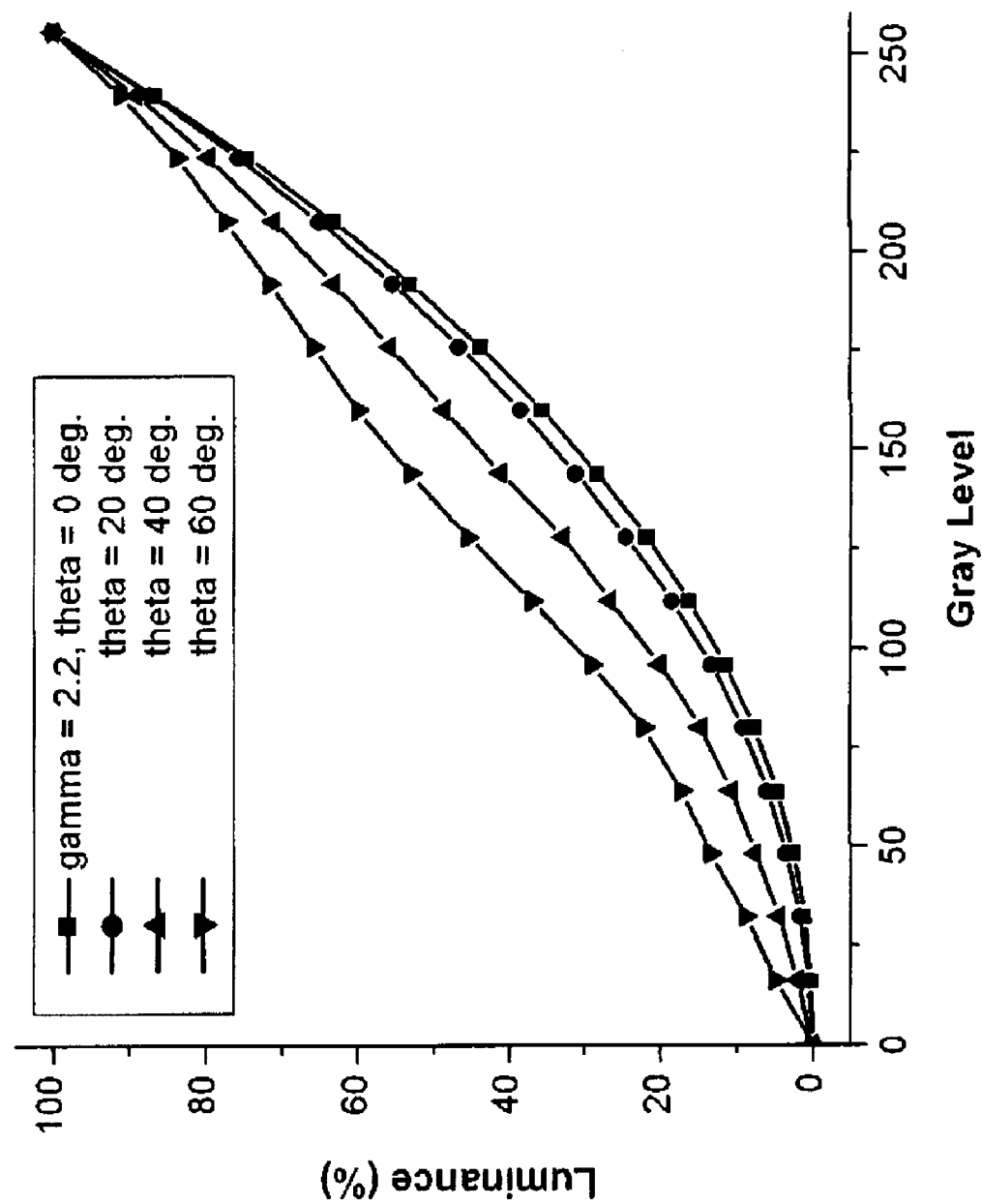
FIG. 17 shows the typical gamma curves at different incident angles with a gamma correction factor $\gamma=2.2$ in the MVA LCD panel shown in FIGS. 14a and 14b.

FIG. 17 depicts the typical gamma curves of the whole pixel 1400 at different incident angles with a gamma correction factor γ=2.2 in the embodiment 4. Here, the azimuthal angle is set at 0° and an 8-bit grayscale with 256 gray levels is evaluated. As calculated from Eq. 1, its D value is 0.2369 at the (θ, φ)=(60°, 0°) viewing direction. In contrast, the conventional four-domain MVA LCD has a D value of 0.3510. The embodiment 4 shows 32.5% improvement over the conventional MVA LCD, which indicates that the proposed embedment has a better off-axis image quality.

Figure 18A:
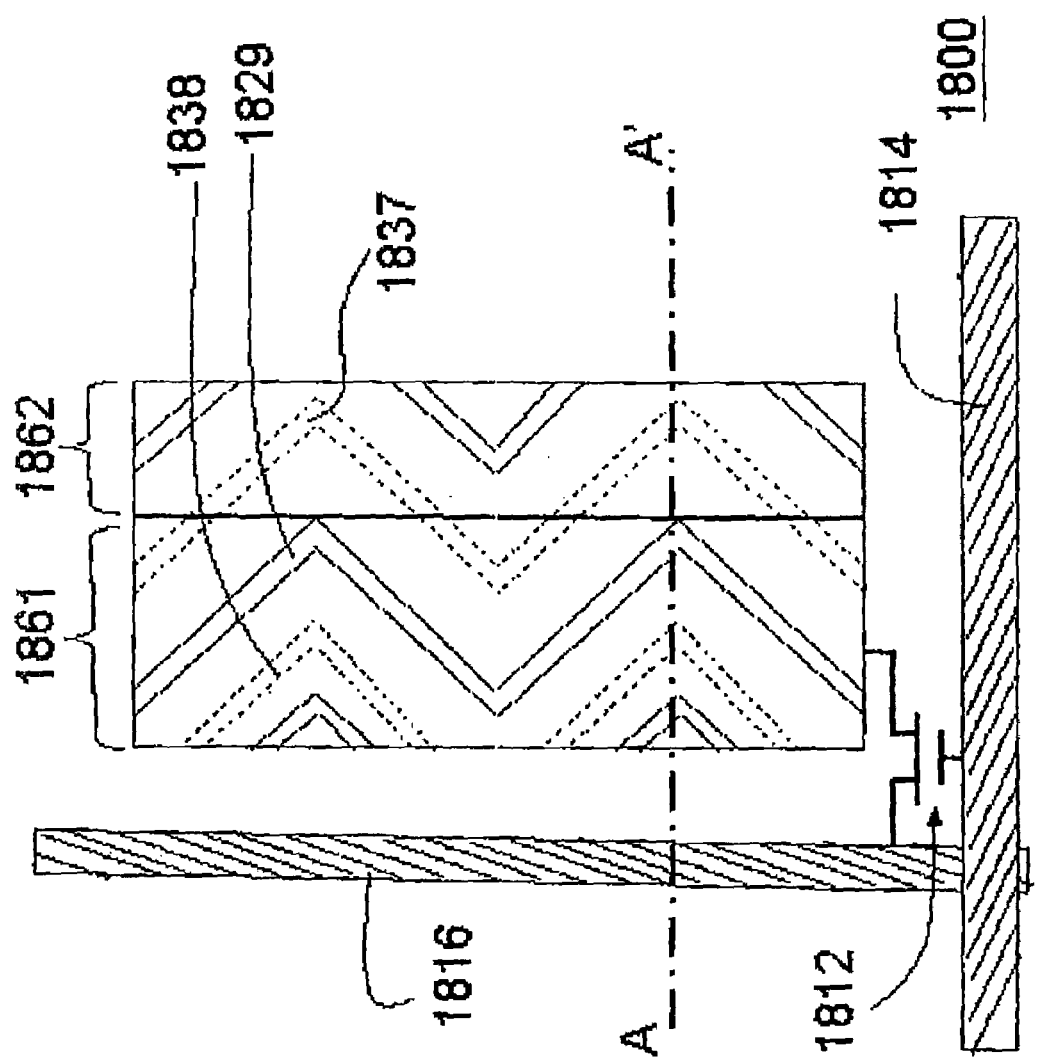
FIG. 18a shows a plane view of a MVA LCD panel of another embodiment of the present invention.
Figure 18B:
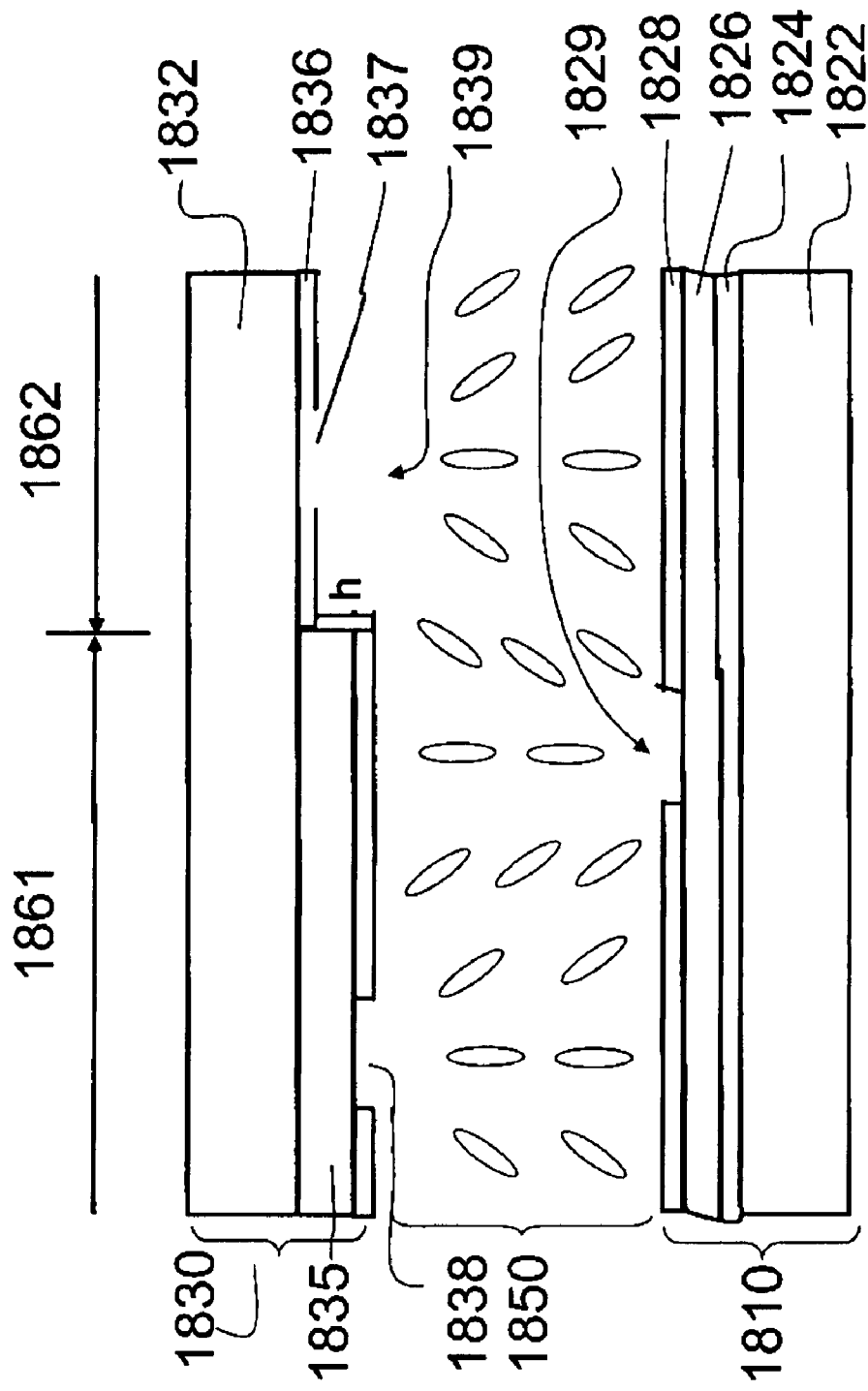

An alternative MVA LCD panel configuration is shown in FIG. 18a and FIG. 18b, where FIG. 18a shows a plane view of the MVA LCD panel and FIG. 18b is the schematic cross-sectional view along line A-A' in FIG. 18a. Although the main elements in the configuration shown in FIGS. 1a and 1b and 6a and 6b are also used in this alternative configuration, new reference numerals are assigned for this example. Like the example shown in FIGS. 6a and 6b, the configuration shown in FIGS. 18a and 18b include pixel and common electrode domain guiding slits 1829 and 1838, respectively. The primary difference is the use of pixel and common guiding slits in this alternative configuration.

Like the configuration shown in FIGS. 1a and 1b, in the alternative configuration shown in FIGS. 18a and 18b the MVA LCD panel 1000 includes a bottom substrate 1810, a top substrate 1830 and a liquid crystal layer 1850 sandwiched therebetween. The bottom substrate 1810 includes a transparent substrate 1822, a plurality of TFT 1812, a plurality of scan lines 1814, a plurality of data lines 1816, a gate insulating layer 1824, a passivation layer 1826, and a plurality of pixel electrodes 1828 as shown in FIG. 18b. Each TFT 1812 is deposited inside one of the unit pixel region 1800 and is connected to the corresponding scan lines 1814 and data lines 1816 as shown in FIG. 18a. The gate insulating layer 1824 is formed to cover the scan lines 1814, and the passivation layer 1826 is formed to cover the data lines 1816 over the transparent substrate 1822 which can be made of a transparent glass. Both the gate insulating layer 1824 and passivation layer 1826 may be an organic material such as a-Si:C:O and a-Si:O:F, or an inorganic material such as silicon nitride ($SiN_x$) and silicon oxide ($SiO_2$), which is prepared by plasma enhanced chemical vapor deposition or other similar sputtering methods commonly known in the art.

As previously described, each pixel electrode 1828 is electrically connected to a corresponding TFT 1812 and the transparent pixel electrode 1828 is usually made of an electrically conductive material with high optical transparency, such as indium tin oxide (ITO), indium zinc oxide (IZO) or zinc oxide (ZnO). Each pixel electrode 1828 has a plurality of domain guiding layer 1829, which are the LC alignment slits formed by the opening patterns through the etching of transparent pixel electrode 1828.

The top substrate 1830 includes of a transparent substrate 1832, a plurality of over-coating layer 1835, a plurality of common electrode 1836, a plurality of domain guiding layer 1837, a plurality of domain guiding layer 1838, and a plurality of electric shielding layer 1839. The over-coating layer 1035 is disposed beneath the transparent substrate 1032 to cover the color filter 1034. The material of the over-coating layer 1835 can be an acrylic resin, polyamide, ployimide, or novolac epoxy resin. The over-coating layer 1835 is patterned by a process employing photolithography and etching to form a plurality of partially etched regions, whose thickness is typically larger than 0.1 μm. The un-etched region is the main region 1861 and the etched region is the sub region 182.

Each common electrode 1836 is deposited over the over-coating layer 1835 and the etched sub region 1862. The transparent common electrode 1836 is usually made of an electrically conductive material with high optical transparency, such as indium tin oxide (ITO), indium zinc oxide (IZO) or zinc oxide (ZnO). The electric shielding layers 1839 are deposited to fill the etched sub region 1862 on the common electrode 1836. The electric shielding layer 1839 may be comprised of an organic material such as a-Si:C:O and a-Si:O:F, or an inorganic material such as silicon nitride ($SiN_x$) and silicon oxide ($SiO_2$) which is prepared by plasma enhanced chemical vapor deposition or other similar sputtering methods commonly know in the art. As shown in FIG. 18b, each common electrode 1836 has a plurality of domain guiding layer 1838 in main region 1861 and a plurality of domain guiding layer 1837 in sub region 1862, which are the LC alignment slits formed by the opening patterns through the etching of transparent common electrode 1836.

During simulation, the repeated unit pixel size of the MVA LCD structure was set at approximately 100 μm×450 μm and the domain guiding layers 1829 and 1838 are the zigzag shaped ones with width of approximately w=12 μm. The gap between the neighboring domain guiding layers on the projection plane is approximately g=35 μm. The electric shielding layer 1839 is flat and made of $SiN_x$ with a height of approximately h=1.2 μm. The electric shielding layer 1839 covers the sub region 1862 and the domain guiding layer 1837 has a width of approximately $w_e$=12 μm in sub region 1862. The area ratio between the main region 1061 and the sub region 1062 is selected at approximately 2:1. The cell gap between the top and bottom substrates is approximately 4 μm. In this example, a Merck negative $\Delta \in$ LC mixture MLC-6608 (birefringence Δn=0.083 at λ=550 nm, dielectric anisotropy $\Delta \in$=−4.2 and rotational viscosity $\gamma_1$=0.186 Pa·s) is aligned vertical to the top and bottom substrates in the initial state. Its azimuthal angle is approximately 0° and pretilt angle is approximately 90°.

While the common and pixel domain guides have been shown as common and pixel domain slits, alternative configures such as domain guide protrusions or a combination thereof may be substituted.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A multi-domain vertical alignment liquid crystal display panel comprising:
    a first substrate;
    a second substrate having an insulating layer on an interior surface facing the first substrate and a passivation layer on the insulating layer;
    an over-coating layer formed on at least a portion of one of the first substrate and the passivation layer;
    a common electrode disposed on one of the first substrate and the over-coating layer on the first substrate;
    a pixel electrode formed on the passivation layer when the over-coating layer is formed on the first substrate and when the over-coating layer is formed on the portion of the passivation layer, the pixel electrode formed on a remaining portion of the passivation layer adjacent to the over-coating layer and covering the over-coating layer;
    a plurality of common and pixel domain guides formed respectively in the common electrode and the pixel electrode, the common domain guides nonaligned with the pixel domain guides;
    an electric shield formed over the corresponding one of the common electrode and pixel electrode adjacent to the over-coating layer;
    a vertically aligned liquid crystal layer sandwiched between the first and second substrates; and
    a drive circuit connected with the common electrode and the pixel electrode for applying a voltage to generate an electric field between the first substrate and the second substrate to control a liquid crystal molecule orientation corresponding to a positioning of the plurality of common and pixel domain guides and plurality of electric shields to form a multi-domain vertical aligned liquid crystal display panel.

2. The liquid crystal display panel of claim 1, wherein a thickness of the said over-coating layer ranges from 0 μm to 50 μm.

3. The liquid crystal display panel of claim 1 wherein said electric shielding layer has an area ratio corresponding to said liquid crystal display panel is larger than 1:1000.

4. The liquid crystal display panel of claim 1, wherein each of said plural common and pixel domain guides is a protrusion on the common electrode and the pixel electrode extending into said liquid crystal layer to form the multi-domain liquid crystal display configuration.

5. The liquid crystal display panel of claim 1, wherein each of said domain guides is a domain guide slit formed in the common electrode and the pixel electrode dividing the common electrode into at least two common electrodes and dividing the pixel electrode into at least two pixel electrodes to form the multi-domain liquid crystal configuration.

6. The liquid crystal display panel of claim 1, wherein the plural common and pixel domain guides comprise:
    a common domain guide in the common electrode in each pixel region of the liquid crystal display panel; and
    a pixel domain guide in the pixel electrode in each pixel region of the liquid crystal display panel, the common domain guide above and on one side of the pixel domain guide.

7. The liquid crystal display panel of claim 6, wherein the common domain guide is located above and on one side of the pixel domain guide and the electric shield is located above and on an opposite side of the pixel domain guide dividing the common electrode into a first, second and third common electrode to form an eight domain multi-domain vertical alignment liquid crystal display panel.

8. The liquid crystal display panel of claim 6, wherein the common domain guide is located above and on one side of the pixel domain guide and the electric shield is located above and on an opposite side of the pixel domain guide dividing the common electrode into a first and a second common electrode to form the multi-domain liquid crystal display panel having six domains in each pixel region.

9. The liquid crystal display panel of claim 6, wherein the common domain guide is located above and on one side of the pixel domain guide and the electric shield is located above and on an opposite side of the pixel domain guide dividing the common electrode into a first and a second electrodes to form the multi-domain liquid crystal display panel having eight domains in each pixel region.

10. The liquid crystal display panel of claim 6, wherein the common domain guide comprises:
   a first and a second common domain guide on opposite sides of the pixel domain guide dividing the common electrode into at least two common electrodes.

11. The liquid crystal display panel of claim 1, wherein the drive circuit comprises:
   a plurality of scan lines;
   a plurality of data lines; and
   plural thin film transistors, one of the plural thin firm transistors deposited in each pixel region of the liquid crystal display panel, the plural thin film transistors connected to the plural scan lines and the plural data lines.

12. The liquid crystal display panel of claim 1, further comprising:
   a first and second crossed polarizer formed respectively on an exterior surface of the first and second substrates.

13. The liquid crystal display panel of claim 1, further comprising:
   a color filter formed on the first substrate between the first substrate and the over-coating-layer.

14. A method of fabricating a liquid crystal display panel having plural pixel regions comprising the steps of:
   providing a first substrate;
   providing a second substrate;
   forming an insulator layer on the interior surface of the second substrate;
   forming a passivation layer on the insulating layer;
   forming an over-coating layer on a portion of one of the first substrate and the passivation layer;
   forming a common electrode on a corresponding one of the first substrate the over-coating layer;
   forming a pixel electrode on the insulator layer;
   forming a plurality of non aligned common domain guides and pixel domain guides respectively in the common electrode and the pixel electrode;
   forming an electric shield adjacent to the over-coating layer on the corresponding one of the common electrode and pixel electrode;
   sandwiching a vertically aligned liquid crystal layer between the first and second substrates; and
   connecting a drive circuit with the common electrode and the pixel electrode for applying a voltage to the common electrode and the pixel electrode to generate an electric field between the first substrate and the second substrate to control a liquid crystal molecule orientation corresponding to a positioning of the plurality of common and pixel domain guides and plurality of electric shields to form a multi-domain vertically aligned liquid crystal display panel.

15. The method of claim 14, wherein connecting a drive circuit step comprises the step of:
   fabricating a plurality of thin film transistors, plural scan lines and plural data lines on the interior surface of the second substrate, each thin film transistor located in one of plural pixel regions with the insulating layer covering the plurality of thin film transistors, plural scan lines and plural data lines; and
   electrically connecting each one of the plural thin film transistors to one of the plural pixel electrodes, one of the plural data lines and one of the plural scan lines in each of the plural pixel regions.

16. The method of claim 14, wherein the varied thickness of the over-coating layer ranges between approximately 0 μm to approximately 50 μm.

17. The method of claim 14, wherein the area ratio of the electric shield corresponding to the liquid crystal display panel is greater than approximately 1:1000.

18. The method of claim 14, wherein the pixel electrode is an electrically conductive material with high optical transparency selected from a group consisting of: indium tin oxide (ITO), indium zinc oxide (IZO) and zinc oxide (ZnO).

19. The method of claim 14, wherein the forming plural domain guides comprises the step of:
   forming a common domain guide protrusion and a pixel domain guide protrusion on each of the corresponding common electrode and pixel electrode.

20. The method of claim 19, wherein the common domain guide protrusion and a pixel domain guide protrusion are formed by depositing a material selected from a group consisting of an organic material and an inorganic material.

21. The method of claim 20, wherein the organic material is selected from a group consisting of a-Si:C:O and a-Si:O:F.

22. The method of claim 20, wherein the inorganic material is selected from a group consisting of silicon nitride ($SiN_x$) and silicon oxide ($SiO_2$).

23. The method of claim 14, wherein the forming plural domain guides comprises the step of:
   forming a common domain guide slit and a pixel domain guide slit on each of the corresponding common electrode and pixel electrode.

24. The method of claim 14, further comprising:
   forming a plurality of scanning lines and data lines on the second substrate; to define a pixel electrode areas; and
   forming a plurality of thin film transistors connected to the scanning lines and data lines in each pixel region.

25. The method of claim 14, wherein step of forming plural domain guides comprise:
   forming a common domain guide in the common electrode in each pixel region of the liquid crystal display panel; and
   forming a pixel domain guide in the pixel electrode in each pixel region of the liquid crystal display panel, the common domain guide above and on one side of the pixel domain guide.

26. The method of claim 14, wherein the common domain guide is formed above and on one side of the pixel domain guide and the electric shield is located above and on an opposite side of the pixel domain guide dividing the common electrode into a first, second and third common electrode to form the multi-domain liquid crystal display panel having eight domains in each pixel region.

27. The method of claim 14, wherein the common domain guide is located above and on one side of the pixel domain guide and the electric shield is located above and on an opposite side of the pixel domain guide dividing the common electrode into a first and a second common electrode to form the multi-domain liquid crystal display panel having six domains in each pixel region.

28. The method of claim 14, wherein the step of forming the common domain guide comprises the step of:
   forming a first and a second common domain guide on opposite sides of the pixel domain guide dividing the common electrode into three common electrodes.

29. The method of claim 14, further comprising the step of:
   layering a color filter on an interior surface of the first substrate between the first substrate and the over-coating layer.

30. A multi-domain vertical alignment liquid crystal display panel comprising:
- a first substrate;
- a common electrode disposed on the first substrate;
- a first and a second common domain guide in the common electrode dividing the common electrode into a first, second and third common electrode;
- a second substrate having an insulating layer on an interior surface facing the first substrate;
- a passivation layer formed on the insulating layer;
- an over coating formed over a portion of the passivation layer;
- a pixel electrode formed on the other portion of the passivation layer, on the adjacent side of the over coating and on the exterior surface of the over coating;
- a pixel domain guides formed in the pixel electrode not covering the over coating, the pixel domain guide located below and between the first and second common domain guides;
- a pixel electric shield formed over the pixel electrode adjacent to the over coating layer and the pixel domain guide below one of the common domain guides to separate the pixel electrode into different regions;
- a vertically aligned liquid crystal layer sandwiched between the first and second substrates; and
- a drive circuit connected with the common electrode and the pixel electrode for applying a voltage to generate an electric field between the first substrate and the second substrate to control a liquid crystal molecule orientation corresponding to a positioning of the plurality of common and pixel domain guides and plurality of electric shields to form a multi-domain vertical aligned liquid crystal display panel having eight domains.

31. The multi-domain vertical alignment liquid crystal display panel claimed in claim 30 further comprising:
- a color filter formed on the first substrate between the first substrate and the common electrode.

32. The liquid crystal display panel of claim 30, wherein the drive circuit comprises:
- a plurality of scan lines;
- a plurality of data lines; and
- plural thin film transistors, one of the plural thin firm transistors deposited in each pixel region of the liquid crystal display panel, the plural thin film transistors connected to the plural scan lines and the plural data lines.

33. The liquid crystal display panel of claim 30, wherein each of said plural common and pixel domain guides is a protrusion on the common electrode and the pixel electrode extending into said liquid crystal layer to form the multi-domain liquid crystal display configuration.

34. The liquid crystal display panel of claim 30, wherein each of said plural domain guides and pixel guide is a slit formed in the common electrode and the pixel electrode to form the multi-domain liquid crystal configuration.

35. The liquid crystal display panel of claim 30, further comprising:
- a first and second crossed polarizer formed respectively on an exterior surface of the first and second substrates.

* * * * *